United States Patent
Helms et al.

(10) Patent No.: US 10,810,134 B2
(45) Date of Patent: Oct. 20, 2020

(54) SHARING VIRTUAL AND REAL TRANSLATIONS IN A VIRTUAL CACHE

(71) Applicant: International Business Machines Corporation, Armonk, NY (US)

(72) Inventors: Markus Helms, Boeblingen (DE); Christian Jacobi, West Park, NY (US); Martin Recktenwald, Schoenaich (DE); Johannes C. Reichart, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 15/844,239

(22) Filed: Dec. 15, 2017

(65) Prior Publication Data
US 2018/0365164 A1 Dec. 20, 2018

Related U.S. Application Data

(63) Continuation of application No. 15/625,336, filed on Jun. 16, 2017.

(51) Int. Cl.
*G06F 12/10* (2016.01)
*G06F 9/455* (2018.01)
(Continued)

(52) U.S. Cl.
CPC ...... *G06F 12/1027* (2013.01); *G06F 9/45558* (2013.01); *G06F 12/0875* (2013.01);
(Continued)

(58) Field of Classification Search
CPC ............. G06F 12/1027; G06F 9/45558; G06F 12/1009; G06F 9/45545; G06F 2212/152; G06F 2212/60; G06F 2212/68
See application file for complete search history.

(56) References Cited

U.S. PATENT DOCUMENTS

| | | |
|---|---|---|
| 4,654,790 A | 3/1987 | Woffinden |
| 5,668,968 A | 9/1997 | Wu |
(Continued)

FOREIGN PATENT DOCUMENTS

| | | |
|---|---|---|
| CN | 105095104 A | 11/2015 |
| CN | 105095114 A | 11/2015 |
(Continued)

OTHER PUBLICATIONS

International Search Report and Written Opinion dated Oct. 12, 2018 for Application PCT/IB2018/054355.
(Continued)

*Primary Examiner* — Masud K Khan
(74) *Attorney, Agent, or Firm* — Nathan M. Rau

(57) ABSTRACT

Disclosed herein is a virtual cache directory in a processor that eliminates address translations when the virtual address and the real address in the cache directory are the same. The processor is configured to support virtual memory and multiple threads. The virtual cache directory includes a plurality of directory entries, each entry is associated with a cache line. Each cache line has a tag. The tag includes a logical address, an address space identifier, a real address bit indicator, and virtual address to real address indicator. This virtual address to real address indicator indicates if the logical address and the real address are the same. When activated, address translation is not performed.

12 Claims, 17 Drawing Sheets

(51) Int. Cl.
*G06F 12/08* (2016.01)
*G06F 12/1027* (2016.01)
*G06F 12/0875* (2016.01)
*G06F 12/1009* (2016.01)

(52) U.S. Cl.
CPC ...... *G06F 12/1009* (2013.01); *G06F 9/45545* (2013.01); *G06F 2009/45583* (2013.01); *G06F 2212/152* (2013.01); *G06F 2212/60* (2013.01); *G06F 2212/601* (2013.01); *G06F 2212/68* (2013.01)

(56) References Cited

U.S. PATENT DOCUMENTS

| | | | |
|---|---|---|---|
| 6,055,605 | A | 4/2000 | Sharma et al. |
| 6,122,709 | A | 9/2000 | Wicki et al. |
| 6,138,226 | A | 10/2000 | Yoshioka et al. |
| 7,472,226 | B1 | 12/2008 | Emma et al. |
| 7,873,785 | B2 | 1/2011 | Olukotun |
| 8,041,894 | B2 | 10/2011 | Krumm et al. |
| 8,095,771 | B2 | 1/2012 | Sheu et al. |
| 8,650,012 | B1 | 2/2014 | Dobbelaere |
| 9,183,146 | B2 | 11/2015 | Habermann et al. |
| 9,274,959 | B2 | 3/2016 | Habermann et al. |
| 9,477,613 | B2 | 10/2016 | Berger et al. |
| 9,563,568 | B2 | 2/2017 | Habermann et al. |
| 2003/0188178 | A1 | 10/2003 | Strongin et al. |
| 2006/0184741 | A1 | 8/2006 | Hrusecky et al. |
| 2006/0236070 | A1 | 10/2006 | Wang et al. |
| 2009/0210624 | A1 | 8/2009 | Luick |
| 2009/0216949 | A1* | 8/2009 | Krumm ............... G06F 12/0811 711/122 |
| 2010/0180083 | A1 | 7/2010 | Lee et al. |
| 2010/0211616 | A1 | 8/2010 | Khandelwal et al. |
| 2012/0008674 | A1 | 1/2012 | Yamamoto et al. |
| 2013/0024648 | A1 | 1/2013 | Chen et al. |
| 2014/0082252 | A1 | 3/2014 | Alexander et al. |
| 2014/0129774 | A1 | 5/2014 | Habermann et al. |
| 2014/0223104 | A1 | 8/2014 | Solihin |
| 2015/0339226 | A1 | 11/2015 | Greiner et al. |
| 2016/0188486 | A1 | 6/2016 | Sohi et al. |
| 2016/0224471 | A1 | 8/2016 | Avudaiyappan |
| 2017/0091117 | A1* | 3/2017 | Cain, III ............... G06F 12/121 |
| 2017/0109289 | A1* | 4/2017 | Gonzalez Gonzalez ................ G06F 12/0895 |
| 2018/0011790 | A1 | 1/2018 | Gaur et al. |

FOREIGN PATENT DOCUMENTS

| | | |
|---|---|---|
| CN | 105677581 A | 6/2016 |
| GB | 2307319 B | 5/1997 |
| WO | 2007106383 A1 | 9/2007 |
| WO | WO-2007106383 A1 * | 9/2007 ......... G06F 12/1027 |
| WO | 2014206217 A1 | 12/2014 |
| WO | 2016082793 A1 | 6/2016 |

OTHER PUBLICATIONS

Basu, A., "Revisiting Virtual Memory," Dissertation in partial fulfillment of the requirements for the degree of Doctor of Philosophy (Computer Sciences), 2013, 177 pages.

Park et al., "Efficient Synonym Filtering and Scalable Delayed Translation for Hybrid Virtual Caching," 2016 ACM/IEEE 43rd Annual International Symposium on Computer Architecture (ISCA '16), Jun. 2016, pp. 90-102, IEEE Press. DOI: 10.1109/ISCA.2016.18.

Yoon et al., "Revisiting Virtual L1 Caches: A Practical Design Using Dynamic Synonym Remapping," 2016 IEEE International Symposium on High Performance Computer Architecture (HPCA), 2016, pp. 212-224. DOI: 10.1109/HPCA.2016.7446066.

Kaxiras et al., "A New Perspective for Efficient Virtual-Cache Coherence," ISCA '13: Proceedings of the 40th Annual International Symposium on Computer Architecture, Jun. 2013, pp. 1-12, ACM. DOI: 10.1145/2485922.2485968.

Qiu et al., "The Synonym Lookaside Buffer: A Solution to the Synonym Problem in Virtual Caches," IEEE Transactions on Computers, vol. 57, No. 12, Dec. 2008, pp. 1585-1599, IEEE. DOI: 10.1109/TC.2008.108.

Jacobi et al., "Cache Structure Using a Logical Directory," U.S. Appl. No. 15/625,223, filed Jun. 16, 2017.

Helms et al., "Translation Support for a Virtual Cache," U.S. Appl. No. 15/625,289, filed Jun. 16, 2017.

Helms et al., "Sharing Virtual and Real Translations in a Virtual Cache," U.S. Appl. No. 15/625,336, filed Jun. 16, 2017.

Jacobi et al., "Cache Structure Using a Logical Directory," U.S. Appl. No. 15/844,084, filed Dec. 15, 2017.

Helms et al., "Translation Support for a Virtual Cache," U.S. Appl. 15/844,164, filed Dec. 15, 2017.

List of IBM Patents or Patent Applications Treated as Related, Signed Dec. 15, 2017, 2 pages.

International Search Report and Written Opinion dated Sep. 17, 2018 for Application PCT/IB2018/054357.

International Search Report and Written Opinion dated Sep. 19, 2018 for Application PCT/IB2018/054356.

IBM, "Per-Thread Valid Bits for Multithreaded Effective to Real Address Translation (ERATs)," IP.com Prior Art Database Technical Disclosure, IP.com No. IPCOM000022179D, Mar. 1, 2004, 2 pages. https://ip.com/IPCOM/000022179.

\* cited by examiner

SHARING VIRTUAL AND REAL TRANSLATIONS IN A VIRTUAL CACHE

BACKGROUND

The present disclosure relates to the field of digital computer systems, and more specifically, to a method for controlling access to a cache memory.

Recent microprocessor architecture allows software to use so-called "virtual" (or sometimes called "logical") addresses to reference memory locations. The memory access itself is done using a "physical" (or sometimes called "absolute") address. To translate between the two, typically a data structure called Translation Lookaside Buffer (TLB) is involved. The process of translating is sometimes called Dynamic Address Translation (DAT), in particular in the IBM z/Architecture.

In a typical microprocessor system, several levels of caches are used to speed up memory accesses by keeping a copy of the memory contents "close" to the processor core. With cache implementations supporting DAT, a frequently used implementation indexes into the cache directory using part of the logical address, and the so-called "tag" information that the lookup request is compared against is using absolute addresses. This requires a translation of the logical address as used by the program into an absolute address, usually involving a lookup in the TLB.

However, with ever-growing microprocessor core caches, TLBs also have to grow, and the power consumption of the TLB lookup in addition to the directory lookup is a significant contributor to microprocessor core power. Also, the size of the TLB is limited by timing constraints, as the TLB lookup itself will become part of the critical path.

SUMMARY

Various embodiments provide a method for controlling access to a cache memory, apparatus and computer program product as described by the subject matter of the independent claims. Advantageous embodiments are described in the dependent claims. Embodiments of the present invention can be freely combined with each other if they are not mutually exclusive.

One embodiment is directed to a virtual cache directory in a processor. The processor is configured to support virtual memory and multiple threads. The virtual cache directory includes a plurality of directory entries, each entry is associated with a cache line. Each cache line has a tag. The tag includes a logical address, an address space identifier, a real address bit indicator, and virtual address to real address indicator.

One embodiment is directed to a method of operating a primary processor cache for a processor with virtual memory support. The processor uses a logically indexed and logically tagged cache directory and an entry in the directory contains an absolute memory address in addition to a corresponding logical memory address, and a virtual to real flag indicating that the logical address is the same as the real address. The method stores code to a logical memory address in a first entry in the cache directory. Once the code is stored, user codes calls an underlying operating system. The operating system reads the code from the absolute memory address. Once the code is read from the absolute memory address, a transload is executed on the first entry. Following the transload, the method determines if the absolute memory address is equal to the logical memory address. If the absolute memory address is equal to the logical memory address, the virtual to real flag is set to on indicating that the absolute and logical memory addresses are the same.

BRIEF DESCRIPTION OF THE DRAWINGS

In the following embodiments of the invention are explained in greater detail, by way of example only, making reference to the drawings in which.

DETAILED DESCRIPTION

Figure 1:
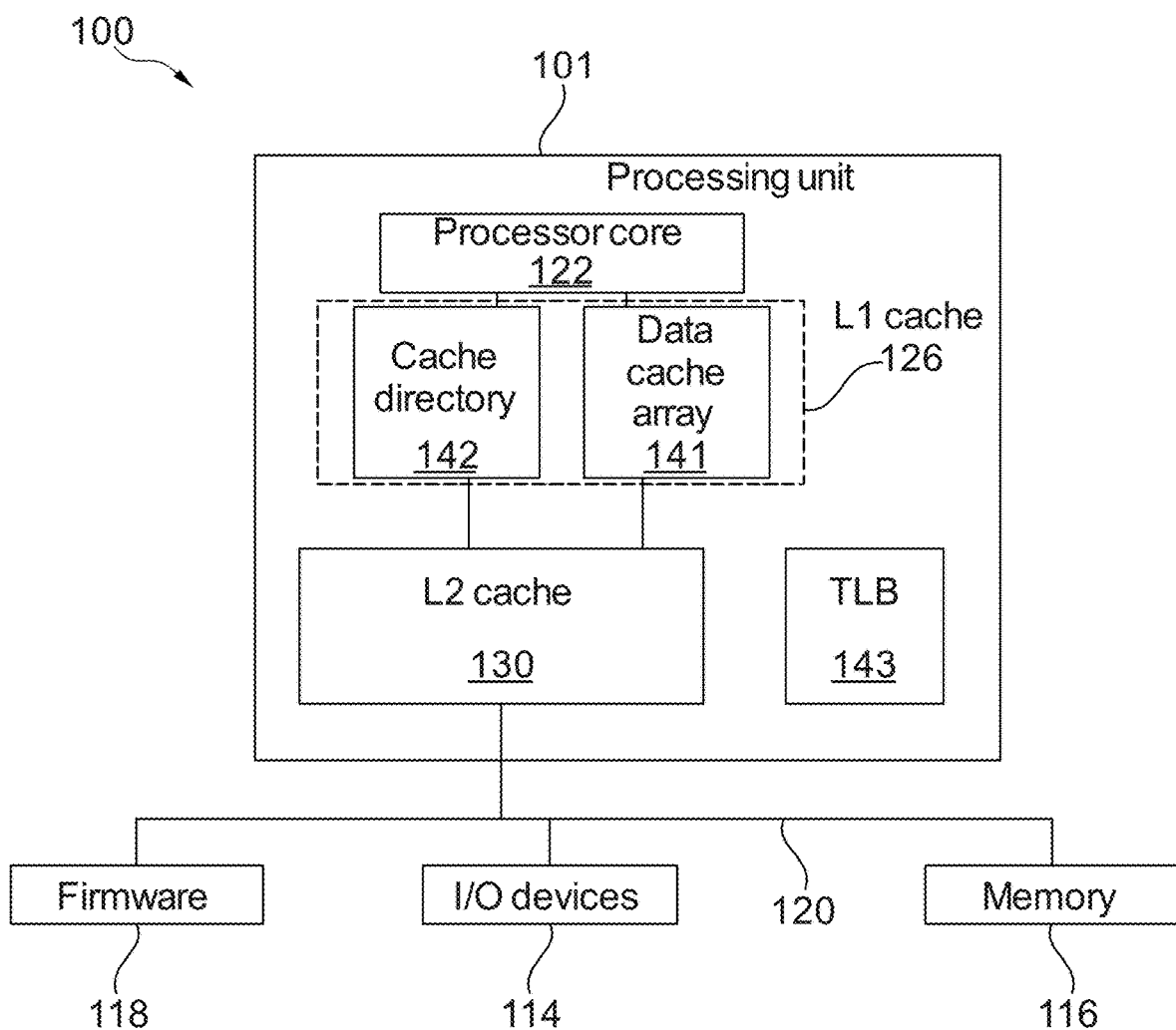
FIG. 1 illustrates a computer system in accordance with an example of the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The cache memory is a set-associative cache.

The present method uses a logically indexed, logically tagged directory that stores all the translation relevant information in the L1 cache. To save as much power as possible, the present method is using a set directory to select the potential hit set for the other L1 cache structures. The set directory is used as cache array late select, and hence may not add to the power and area budget compared to a traditional design. Using the set directory, to save additional power, a "vertically stacked" directory (i.e. the validation directory) is used instead of a traditional set-associative directory structure. As a result, only one set can ever be read out at once, while in prior art all sets belonging to a given index could be read in parallel. For example, as the cache directory can be used to resolve synonym problems, the validation directory sets may not have to be accessed in parallel.

The present method may have the advantage of providing an improved set-associative cache memory with fast access time and yet low power consumption compared to prior art methods where a L1 cache hit requires validation from a higher level cache.

Because of its relatively large size, the TLB usually cannot be placed at close proximity to the memory array. As a result, the total cache access time of a set-associative cache memory increases with the sizes of its TLB and memory arrays. The present method uses a logically tagged and logically indexed validation directory, and may thus avoid the need to power up a TLB for a L1 cache hit signal generation.

According to one embodiment, in case the second searching does not confirm the presence of the cache line in the set, generating a miss signal. The miss signal is a cache miss signal indicating a cache miss for the requested effective address (also referred to as logical or virtual address). The cache miss signal may also be generated if the first searching fails to find the requested logical address in the set directory. In response to the generated miss signal the requested cache line may be searched in a higher cache level or in the main memory (e.g. RAM).

According to one embodiment, the cache memory further comprises a translation lookaside buffer, TLB, wherein a given entry in the primary cache directory stores a valid bit, a portion of the effective address and a set index, wherein in case the second searching does not confirm the presence of the cache line in the set, the method further comprises: searching the line index bits in the primary cache directory, resulting in a logical pointer for each set in the primary cache directory, wherein the logical pointer comprises the set index and the portion of the effective address; selecting a logical pointer of the logical pointers whose set index matches the set identifier; searching the effective address in the TLB for identifying an absolute address associated with the effective address; searching the effective address in a higher level secondary cache directory of the cache memory for obtaining an entry corresponding to the effective address in each set in the secondary cache directory, the entry comprising another absolute address; comparing each obtained absolute address of the secondary cache directory to the absolute address of the TLB, resulting in another set identifier of a set of the secondary cache directory; comparing the logical address of the entry of the set of the secondary cache directory having the other set identifier with the selected logical pointer, and based on the comparison results confirming the miss signal or updating the set and validation directories.

The TLB and the higher level cache are used for example in case of a cache miss in the lower level cache. This may provide a reliable validation or confirmation of the cache miss at the lower cache level.

According to one embodiment, the searching of the primary cache directory is performed in parallel to the first searching. This embodiment may further speed up the access to data.

According to one embodiment, the method further comprises: the generating of the hit signal is performed if the valid bit of the logical pointer is set to a valid state. The valid bit is a bit of information that indicates whether the data in a cache line is valid or not. This may further save processing time that would otherwise be required for accessing invalidated data and processing induced corrections.

According to one embodiment, the search in the TLB and the search in the secondary cache directory is performed in parallel. This embodiment may further speed up the access to data.

According to one embodiment, the first group of bits are the least significant bits from the tag field and the second group of bits are the most significant bits from tag field. The second group of bits may be complementary to the first group of bits for confirming the search result of the set directory. For example, if the effective address has a tag filed of 0:49 bits, the first group of bits may be 37:49 and the second group of bits may be 0:36. However, any subset of the tag filed 0:49 can be used as the first or second group of bits. The width of the first groups of bits (i.e. number of bits) may be based on a trade off between wrong prediction (not too small) and timing (not too wide compares) constraints. Using for the first group the bits next to the line index (50:55) of the effective address may be beneficial because that also works for programs with small memory footprint. For example, if bits 0:12 are used for the first group most programs may not be able to use the n-way (e.g. n=8) associativity, because only huge programs may have effective addresses which differ in 0:12 so normally sized programs could only use one set. In other words, the bits of the first group (e.g. 37:49) are chosen such that they are different for most memory accesses and do not yet overlap with the line index.

According to one embodiment, the validation directory is built from one physical array structure that holds one directory entry per each cache line of all sets of the cache memory. This embodiment may enable that only one set can be read out at once, while in prior art all sets belonging to a given index could be read in parallel. This embodiment may thus further speed up the access to data. For example, the outcome of the set directory (e.g. a set identifier) may be used as extension to the line index (e.g. bits 50:55) for searching the validation directory.

According to one embodiment, a given entry in the primary cache directory stores a valid bit, a portion of the effective address and a set index, the method further comprising: in parallel to the first searching, searching the line index bits in the primary cache directory, resulting in a valid bit value for each set in the primary cache directory, selecting a valid bit value of the valid bit values whose associated set index matches the set identifier, wherein the generating of the hit signal is performed if the valid bit value indicates a valid state. This may further save processing time that would otherwise be required for accessing invalidated data and processing induced corrections.

According to one embodiment, the primary cache directory is a L1 level cache directory. According to one embodiment, the secondary cache directory is a L2 level cache directory. These embodiments may be seamlessly integrated in existing systems.

According to one embodiment, the cache memory is a multi-level cache directory further comprising a secondary cache directory. The cache memory is a set-selective memory.

According to one embodiment, a given entry in the primary cache directory stores a valid bit, a portion of the effective address and a set index. The method further comprises: receiving a second effective address synonym of the effective address; repeating the first and second searching using the second effective address; in case the second searching does not confirm the presence of the cache line referred to by the second effective address, invalidating the entry of the set directory corresponding to the second effective address; performing the first searching using the second effective address for detecting a miss; searching the second effective address in the primary cache directory, resulting in a logical pointer for each set in the primary cache directory, wherein the logical pointer comprises the set index and the portion of the second effective address; searching the second effective address in a higher level secondary directory cache of the cache memory for obtaining an entry corresponding to the second effective address in each set in the secondary cache directory; comparing the logical address of the entry of the set of the secondary cache directory with each of the logical pointers, and based on the comparison results confirming the presence of the cache line in the primary cache directory; updating the set and validation directories by overwriting entries related to the effective address by the second effective address; repeating the first searching, the second searching and generation of the conditional hit signal. This embodiment may have the advantage of efficiently solving synonyms issues at the cache memory. It solves synonym problems by relying on the next☐level cache(s). It uses the L1 cache directory to tie the L1 cache and L2 cache together.

FIG. 1 illustrates a computer system 100 in accordance with an example of the present disclosure. The computer system 100 may be based on the z/Architecture, offered by International Business Machines (IBM). Computer system 100 may use a set-associative cache memory structure. Computer system 100 comprises at least one processing unit 101. The processing unit 101 may be connected to various peripheral devices, including input/output (I/O) devices 104 (such as a display monitor, keyboard, and permanent storage device), memory device 106 (such as random-access memory or RAM) that is used by the processing units to carry out program instructions, and firmware 108 whose primary purpose is to seek out and load an operating system from one of the peripherals whenever the computer is first turned on. Processing unit 101 communicates with the peripheral devices (e.g. firmware 118, I/O devices 114 and memory 116) by various means, including a generalized interconnect or bus 120.

Processing unit 101 includes a processor core 122 having a plurality of registers and execution units, which carry out program instructions in order to operate the computer. An exemplary processing unit includes the PowerPC™ processor marketed by International Business Machines Corporation. The processing unit 101 also can have one or more caches. For example, the processing unit 101 is shown as comprising two caches 126 and 130. Caches are used to temporarily store values that might be repeatedly accessed by a processor, in order to speed up processing by avoiding the longer step of loading the values from memory 116.

Caches 126 and 130 are set-associative caches which enable processor to achieve a relatively fast access time to a subset of data or instructions previously transferred from a memory 116.

The cache 126 may be integrally packaged with the processor core 122. The cache 126 may comprise instruction arrays (not shown) and data arrays 141 which are implemented using high-speed memory devices. Instructions and data may be directed to the respective cache by examining a signal that is indicative of whether the processor core is requesting an operation whose operand is instruction versus data. The cache 126 may further comprise a cache directory 142 associated with the data array 141. For example, each cache line in the data array 141 has a corresponding entry in cache directory 142. The cache directory 142 may indicate whether the data identified by an effective address is stored in the data array 141. For example, a processor instruction that references an effective address can be provided to the cache 126. If the effective address is in the cache directory 142, then the processor knows it can get the referenced data from the data array 141 subject to access criteria being fulfilled, wherein access criteria may require that the valid bit is set etc. For example, the effective address includes a tag field, a line index field, and a byte field. The tag field of the effective address is utilized to provide cache "hit" information as described herein. The line index field of the effective address is utilized to get N cache lines e.g. within data cache array 141, which are indexed by the line index field, where N is the number of sets in a N-associative cache memory. One of the N cache lines may be selected using a set identifier (as part of a late select) and the byte field of the effective address is utilized to index a specific byte within the selected cache line.

The data array 141 and the cache directory 142 may be constructed from conventional memory arrays, such as are readily available in configurations of, for example, 4 M or 8 M chip arrays. The cache 126 is associated with a cache controller (not shown) that for example manages the transfer of data between the processor core 122 and the caches.

Data cache array 141 has many cache lines which individually store the various data values. The cache lines are divided into groups of cache lines called "sets." An exemplary cache line includes a state-bit field, an exclusivity-bit field, and a value field for storing the actual instruction or data. The state-bit field and inclusivity-bit fields are used to maintain cache coherency in a multiprocessor computer system. The address tag is a subset of the full address of the corresponding memory block. A compare match of an incoming effective address with one of the tags within the address-tag field indicates a cache "hit." The collection of all of the address tags in a cache (and sometimes the state-bit and inclusivity-bit fields) is referred to as a directory, and the collection of all of the value fields is the cache entry array.

The cache 126 may be referred to as level 1 (L1) cache and cache 130, may be referred to as a level 2 (L2) cache since it supports the (L1) cache 126. For example, cache 130 may act as an intermediary between memory 116 and the L1 cache, and can store a larger amount of information (instructions and data) than the L1 cache can, but at a longer access penalty. For example, cache 130 may have a storage capacity of 256 or 512 kilobytes, while the L1 cache may have 64 kilobytes of total storage. Cache 130 is connected to bus 120, and all loading of information from memory 116 into processor core 122 may come through cache 130. Although FIG. 1 depicts only a two-level cache hierarchy, multi-level cache hierarchies can be provided where there are many levels of serially connected caches. For example, the components of processing unit 101 may be packaged on a single integrated chip.

Also shown in FIG. 1 is a translation lookaside buffer (TLB) 143 for translating an effective address to a corresponding absolute address. Specifically, TLB 143 may translate the page number portion of an effective address to a corresponding real page number. For example, the tag field of effective address may be sent to TLB 143 to be translated to a corresponding real page number.

In another example, the computer system 100 may comprise at least two translation lookaside buffers of which a first one (TLB1) is a first level buffer and a second one (TLB2) is a second level translation lookaside buffer arranged to feed said first one with address information in case of a missing address of the first one. For example, the address translation tables in memory may be a multi-tier structure. For example, for a two-tier table, the first-level table, called a segment table, contains entries, which each map a MB of memory by point to a second-level table, called a page table, which contains 256 entries mapping 4 KB of memory. The TLB2 may have two types of entries: 1 MB segments and individual 4 KB pages. When a translation is not available in first-level TLB (TLB1), TLB2 is searched for a 4 KB page entry that provides the required translation. If not, then TLB2 is searched for a segment entry for the segment containing the address to be translated. If such an entry is found, then the translation using the tables in memory is short-circuited because the appropriate page table can be accessed directly without having to access the segment table in memory. And TLB1 may comprise a 2-dimensional array of entries, e.g., 32 entries long and 4 entries wide. Each entry contains a virtual address that was translated and the real address that it translated to. In this example, the TLB 143 may be TLB1.

In one example, the computer system 100 may be used as a hardware resource in a virtualized environment such as z/VM of IBM. For example, the processing unit 101 may receive requests from virtual machines or a guest running under a hypervisor in a logical partition.

Figure 2:
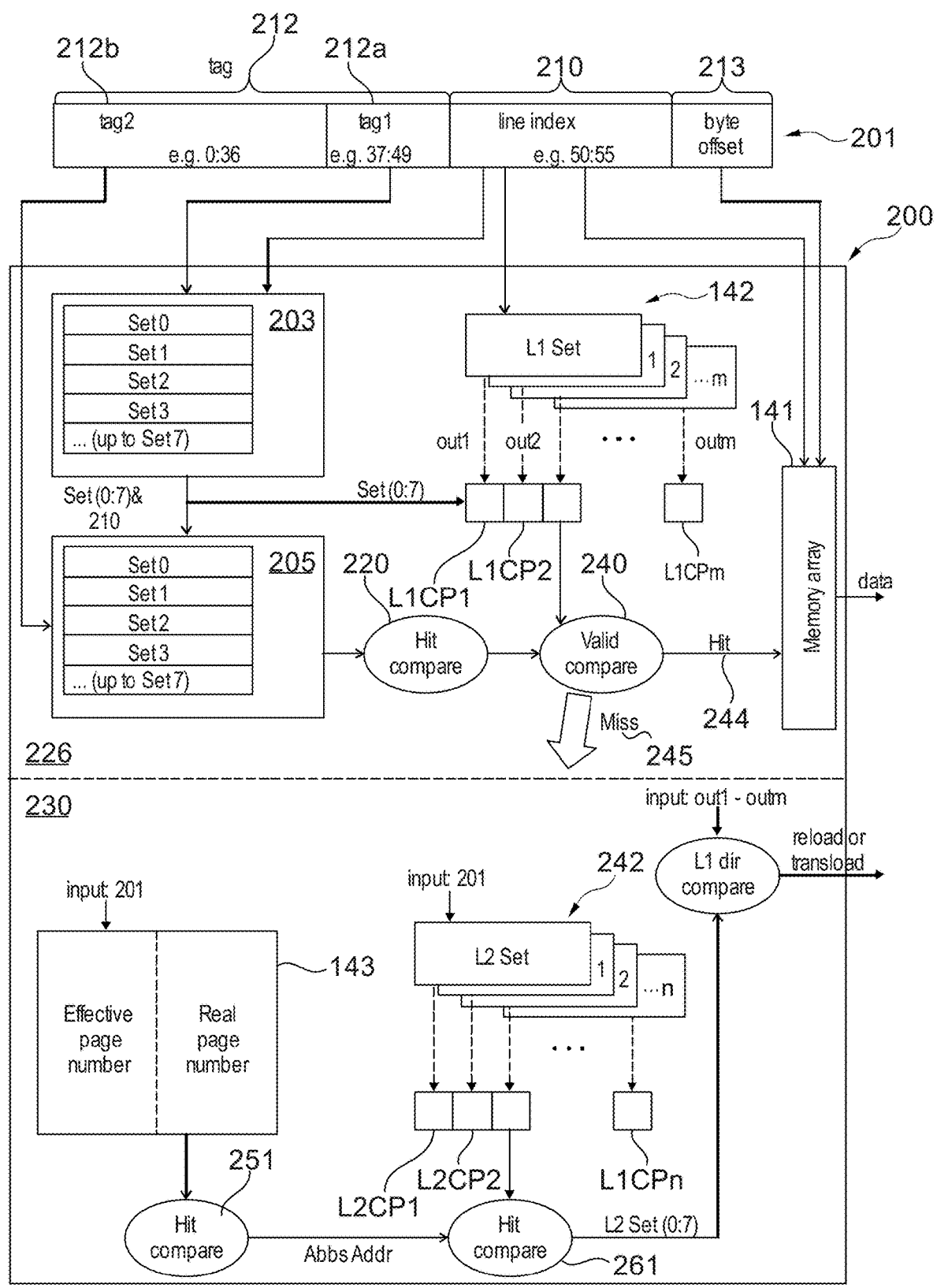
FIG. 2 is a block diagram illustrating a diagram for accessing cache structure of a cache memory with two-level cache.

FIG. 2 is a block diagram illustrating a diagram for accessing cache structure 200 of a cache memory with two-level cache via an effective address (or logical address or virtual address) 201 in accordance with an example of the present disclosure. The cache memory is a set associative cache comprising for example m sets in L1 cache and n sets in L2 cache. m may or may not equal to n. The cache structure 200 comprises a L1 cache 226 and L2 cache 230. The L1 cache 226 comprises as described with reference to FIG. 1 data cache array 141 and cache directory 142. In FIG. 2, the L1 cache 226 further comprises a set directory 203 and validation directory 205. The L2 cache 230 comprises a cache directory 242 and a cache array (not shown).

The set directory 203 is logically indexed using line index bits of the line index field 210 of the effective address 201 and logically tagged using a first group of bits 212a of the tag field 212 of the effective address 201. The validation directory 205 is logically indexed using line index bits of the line index field 210 of the effective address 201 and set bits. The validation directory 205 is logically tagged using a second group of bits 212b of the tag field 212 of the effective address 201. The first and second groups of bits 212a and 212b are shown non-overlapping for exemplification purpose. However, the first group and second of bits may overlap. For example, the second group of bits may comprise bits 0:49 which may enable to have set directory update rules that are relaxed e.g. that allows that the set directory and the validation directory do not have to be strictly in sync at all times.

Each entry of the set directory 203 comprises at least the first group of bits 212a, and a valid bit. If for example, the processor core supports threads (e.g. threads th1 and th2), the entry may comprise a valid bit associated with each thread (e.g. the entry may be as follows: LA.37:49, th0 vld, th1 vld). Each entry of the validation directory 205 comprises at least the second group of bits. In one example, the entry of the validation directory 205 further comprises a valid bit, an exclusivity bit and a key. The valid bit indicates the entry is valid. The exclusivity bit indicates the cache line is owned exclusively. It's called exclusivity bit because no other core can have a copy of the associated line if one core has a line exclusively. Cache lines get requested exclusively if data gets changed. And many cores can have a line in a read-only state. The key is a storage key for protection, and may include any other set of miscellaneous information. In one example, the entry of the validation directory 205 further comprises an ASCE element and a REAL element, where ASCE refers to address space control element (pointer to dynamic address translation tables) and REAL element indicates that the entry is real entry.

The L1 and L2 cache arrays 141 hold the data copy from memory 116 and each entry in L1 and L2 directories 142 and 242 hold the second group of bits 212b, the address space identifier, etc. The L1 directory 142 for example contains the following fields: valid bit, logical address e.g. 45:49, and L2 set ID. The valid bit indicates the L1 directory entry being valid or not valid. The logical address 45:49 is an extension of the L1 logical address 50:55 to allow access of the L2 directory. The L2 set ID identifies which L2 directory set contains the L1 cache entry. For example, an entry of the L1 directory 142 may be as follows: set0-L2CC(45:49), th0 logdir vld, th1 logdir vld, ptrdir vld, where L2CC(45:49) are the bits 45:49 of the effective address (also referred to logical address). Bit 45 is stored for data cache only, because L2 for data is of size 4M, while L2 for instructions is of size 2M. "logdir vld" indicates that the translation stored in L1 cache is valid. "ptrdir vld" is a valid bit indicating that the data in the L1 cache is valid. The bits "45:49" bits may for example be derived from the cache sizes (e.g. the number of rows). For example, if L1 cache has 64 rows per set, the line index is 50:55 and if L2 has 1024 rows per set, indexing may be wider resulting in an index 45:55. However, since the L1 directory got already indexed with 50:55 pointing to a L2 coordinate may be performed by maintaining LA.46:49 only and L2 set ID in the entry of the L1 directory.

For simplifying the description of FIG. 2, a simplified example of L1 cache may be considered. In this example, the L1 cache has 64 rows and 8 sets (i.e. m=8), and a cache line is addressed using logical address having 64 bits (0:63) (abbreviated LA(0:63)). Therefore, the line size in this example is 256 bytes. In this example, the set directory 203 may use LA(37:49) as a tag (the first group of bits). The tag of the validation directory 205 may be LA(0:49) or LA(0:36), plus additional information required to differentiate between different address spaces.

The validation directory 205 may be referred to as a "Stacked" logical directory as the validation directory is built from one physical array structure that holds one directory entry per row. Following the above example, the validation directory comprises 8×64 rows=512 rows, instead of eight array structures that each has 64 rows. The benefit of such a structure may be that an array row can only have a limited number of bits (for physical reasons). Adding more rows comes with a comparatively low overhead relative to extending the width of a row or adding more array structures. The "stacked" approach may be advantageous as it may use less area and power. The L1 cache directory 142 has however an eight array structures that each has 64 rows.

FIG. 2 further illustrates details of the structure of the L1 cache directory 142 and L2 cache directory 242. The L1 cache directory 142 comprises a set☐associative directory structure with multiple L1 sets e.g. a number m of L1 sets and respective comparators L1CP1-L1CPm. The L2 cache directory 242 comprises a set☐associative directory structure with multiple L2 sets e.g. a number n of L2 sets and respective comparators L2CP1-L1CPn. The L2 cache directory 242 is using parts of the effective address 201 as index and the absolute address as tag.

For example, an entry of the L2 directory may comprise the following: "set0-AA.17:51" with set0 is the set index of the set comprising the entry, AA is the absolute address associated with the effective address that is used to index the L2 directory. In another example, the entry of the L2 directory may further comprise two additional elements "key(0:3), FP", where "key" is a 4 bit tag which may need to match according to rules described in the architecture principles (e.g. z/architecture) of operation of computer system 100, and FP fetch protection, enables the key compare.

The cache structure 200 further comprises TLB 143.

On a cache lookup, the set directory 203 receives as input the index LA(50:55) and first group of bits LA(37:49) and the set directory 203 generates or predicts the set having a set ID referred to as Set(0:7) that holds the requested cache line. For example, the set directory 203 may be searched in order to find the set ID. Using the set ID Set(0:7) in addition to the index LA(50:55), the validation directory 205 is looked up to confirm the cache hit using tag compare 220, which may result in identifying a corresponding directory entry in the validation directory 205. For example, for that, the set ID determined by the set directory 203 is used to select one of the eight 64☐row sections, and LA(50:55) is used to select the row within the section.

In parallel to searching the set directory 203, the L1 cache directory 142 is looked up to retrieve the valid bit for this directory entry. The valid parts are part of the L1 cache directory 142 because multiple entries may have to be invalidated at once. If the tag compare 220 sees a hit 244, and the valid bit is set, the valid compare 240 indicates that a cache hit was found. Otherwise a cache miss 245 may be found. The data array 141 may receive a set identifier from the set directory 203, and may provide data of the requested cache lines using the line index 210 and the byte offset 213 of the effective address 201 and the set identifier. In case of a cache miss, a warning may be provided to indicate that the provided data corresponds to a cache miss.

Only in case of a found cache miss 245 or in case the search in the set directory 203 fails (results in a cache miss) will the data structures in the lower part of FIG. 2 be involved. Namely, the TLB 143 is looked up using the effective address 201 and using the hit compare 251 (including parts of the logical address 201 and translation relevant information such as an address space identifier), the absolute address for the request is determined. The hit compare 251 may be performed by an own compare logic of the TLB. In parallel to searching the TLB 143, the L2 cache directory 242 is looked up e.g. using bits 46:55 of the effective address 201. And the hit compare 261 searches for a hit in the L2 cache directory 242 by comparing the absolute address output by the TLB with the absolute addresses of the L2 cache directory that have been identified using the logical address 201. The result of the hit compare 261 is an indication of which L2 set saw the hit (the drawing assumes 8 sets (i.e. n=8) in the L2 cache). This hit information is then used in the L1 dir compare 270 to see if the line that hits in the L2 cache is also already stored in the L1 cache. For that, the L1 dir compare 270 also uses received input logical pointers (referred to as out1 to outm) to the L2 cache. Each logical pointer (e.g. out1) is associated with a respective L1 set and comprises the L2 index and L2 set ID and valid bit of the entry of L1 directory that corresponds to the index LA(50:55).

Figure 3:
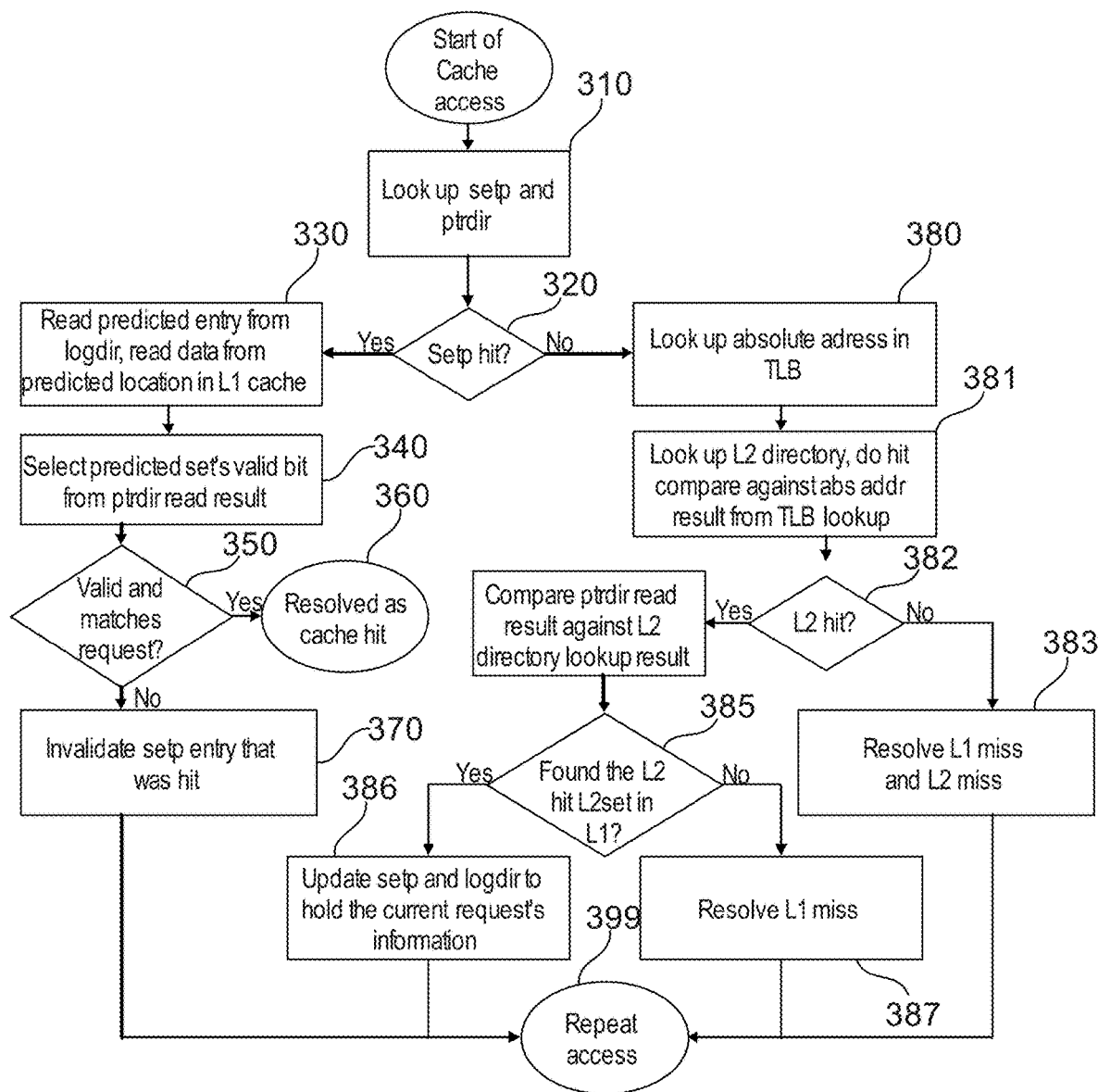
FIG. 3 is a flowchart of a method for operating the cache memory of FIG. 2.

FIG. 3 is a flowchart of a method for operating the cache memory of FIG. 2. Upon receiving an access request e.g. via an effective or logical address to access a given cache line, the set directory 203 (referred to as setp) and the L1 cache directory 142 (referred to as ptdir) are accessed in step 310. This access may for example be in parallel. The access to the set directory 203 and the L1 cache directory 142 is performed using line index bits of the effective address (e.g. LA(50:55)). The access to the set directory 203 may or may not result in a set identifier that indicates the set in which the cache lines exists. The access to the L1 cache directory 142 may or may not result in multiple entries of respective L1 sets as the L1 cache directory uses only as input the line index bits of the effective address.

In case (inquiry 220) of a cache miss that results from searching the set directory 203, steps 380-387 may be performed. In case (inquiry 220) of a cache hit, steps 330-370 may be performed and the set directory 203 may provide a set identifier indicating the set in which the requested cache line exists.

In step 330, the validation directory 205 (referred to as logdir) may be searched using the set identifier that is received from the set directory 203 and the line index bits of the effective address (e.g. LA(50:55)).

It may be determined in step 340 the valid bit associated with the addressed cache line. This may be determined by selecting the entry of the multiple entries using the set identifier and reading the valid bit value of the selected entry.

In case (350) the validation directory 205 provides a cache miss as result of the searching 330 or the valid bit has a value which is indicating an invalid state, the entry of the set directory that has been hit by the search of step 310 may be invalidated 370. Otherwise, a cache hit may be resolved in step 360 e.g. by providing a hit signal.

In step 380, a TLB lookup is done, using the logical address of the request. The result of this lookup is the matching absolute address. Next, in step 381, the L2 cache directory 242 is looked up, and compared against the absolute address as delivered from the TLB. In case of a L2 miss, step 382 branches to 383 to resolve the L1 miss and L2 miss. After having resolved the L1 miss and L2 miss, all data structures are updated such that the cache line can be found in the set directory 203 upon the next request.

If step 382 sees L2 hit, step 384 compares the L1 cache directory contents as identified by searching the in step 310 against the L2 directory contents to see if the cache line is actually in L1. If the compare result shows a L1 hit, step 385 decides to branch to step 386. This is the case where the request did not hit in the set directory 203, but the cache line is actually in L1 cache. This may for example be the case because the set directory is not correct, or it could be because the current request is for a different synonym than the synonym that was stored in the L1 so far (which for the current request is the same as saying "the set directory was not correct"). Either way, step 386 updates the set directory 203 and the validation directory 205 to match the current request. No actual data transfer has to happen. If step 385 did not see a L1 hit, this indicates that the cache line is not in L1 cache—no matter what synonym—but it is in L2 cache. Therefore, in step 387, the L1 miss is resolved, which includes transferring data from L2 to L1 and updating the set directory and validation directory such that on the repeated request, L1 hit will be found.

Following each of steps 370, 383, 386 and 387 is step 399 for repeating the request which may result in a plain L1 hit.

Figure 4:
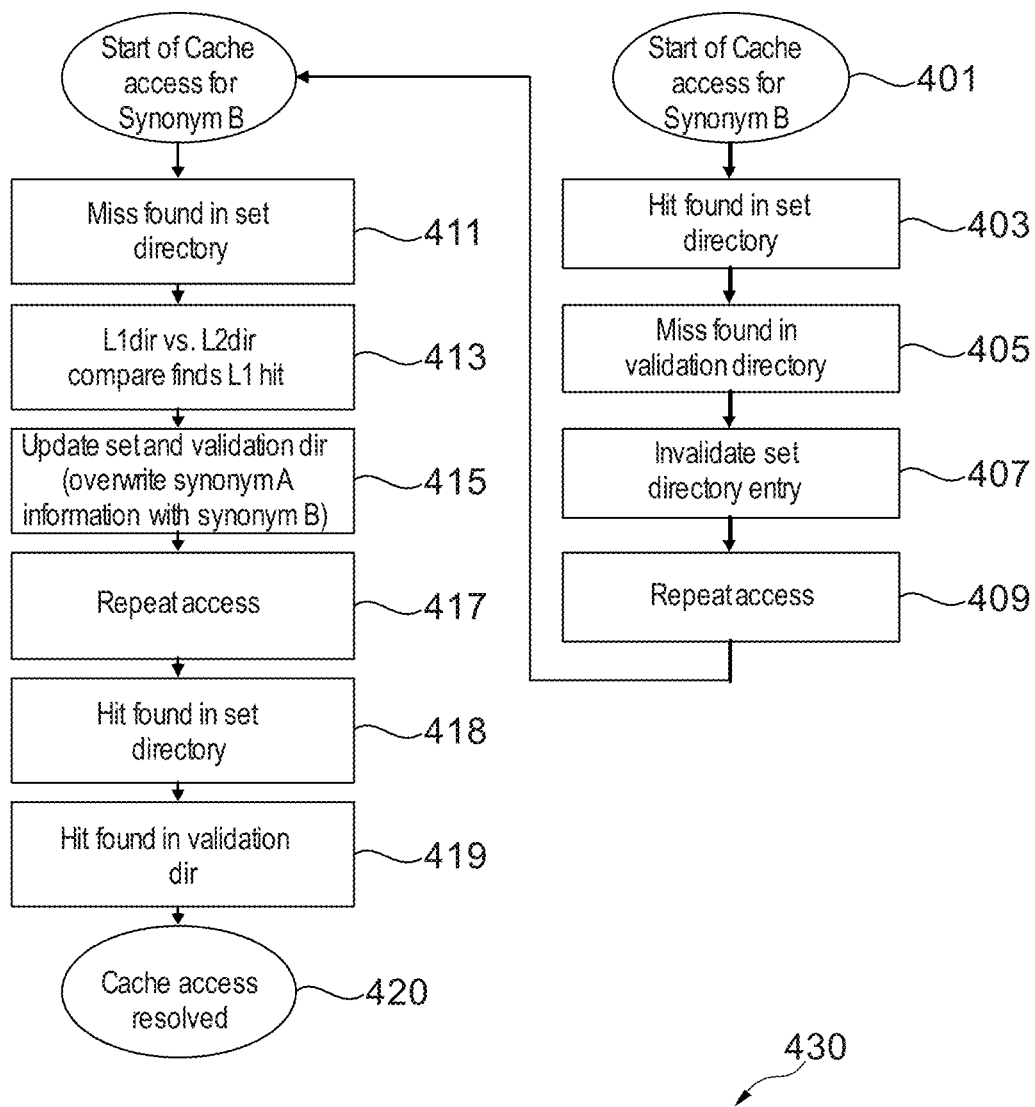
FIG. 4 is a flowchart of a method for resolving synonyms in cache memory of FIG. 2.

FIG. 4 is a flowchart of a method for resolving synonyms in cache memory of FIG. 2 in accordance with the present disclosure.

In step 401, a second effective address (referred to as synonym B) is received. The second effective address is synonym of a previously processed effective address referred to as synonym A. in other terms, synonym B is used for a cache line while another synonym A is already in the L1 cache.

For exemplification purpose, FIG. 4 shows addresses synonym A and B in hexadecimal. For the sake of simplicity, 20 bit addresses (5 hex digits) are shown. In this example, the byte index or offset into the cache line is not shown. Bits are numbered from left to right (bit 0 is the most significant bit), so each address has bits 0:19. Synonym A=12345 and synonym B=67895. In this example, set directory 203 may be indexed using bits 16:19 (i.e. last hex digit of the address), and may be tagged using bits 8:15. As shown in FIG. 4 three example use cases A)-C) 430 are depicted.

In use case A), the synonyms A and B have the same index (setp index=5) and have different tags in the set directory 203. Synonyms A and B map to the same absolute address.

In use case B, the synonyms A and B have the same index (setp index=5) and same tags in the set directory 203. Synonyms A and B map to the same absolute address.

In use case C, lines A and B have the same index (setp index=5) and same tags in the set directory 203. However, they map to different absolute addresses.

In step 403, the set directory 203 is searched for identifying a cache hit for the requested synonym B. This is considered as a "set directory wrong" case because the set directory 203 provided a set that did not really see a hit in the end.

However, the search, in step 405, for synonym B in the validation directory 205 would result in a cache miss. If the lookup were for synonym A, the search in the validation directory 205 would see a hit (and step 360 may be executed). However, as the access was for synonym B, the address as read from the validation directory 205 will not match the requested address.

In step 407, the entry corresponding to synonym B in the set directory 203 is invalidated. And the repeated access using synonym B is triggered in step 409.

Steps 403-420 are executed for the use cases B) and C).

In step 411, the set directory 203 is searched for identifying a cache miss for the requested synonym B.

Upon identifying the cache miss of step 411, step 413 is executed. In step 413 (which performs step 384) the L1 cache directory contents associated with synonym B is compared against the L2 directory contents associated with synonym B to find that the cache line is actually in L1.

Upon identifying or finding the cache hit in step 314, the set directory 203 and the validation directory 205 may be updated in step 415. The update may for example be performed by overwriting synonym A information with synonym B.

Upon performing the update of step 415, the repeat of the access using the synonym B may be triggered in step 417. The repeated access results in a set directory hit in step 428 followed by a validation directory hit in step 419, which results in the cache access being resolved in step 420.

Steps 411-420 may be executed for use case A). For example, if synonym B of use case A) is received a miss may be found as in step 411. In other terms, only steps 411-420 may be executed for a received synonym B of use case A).

Figure 5:
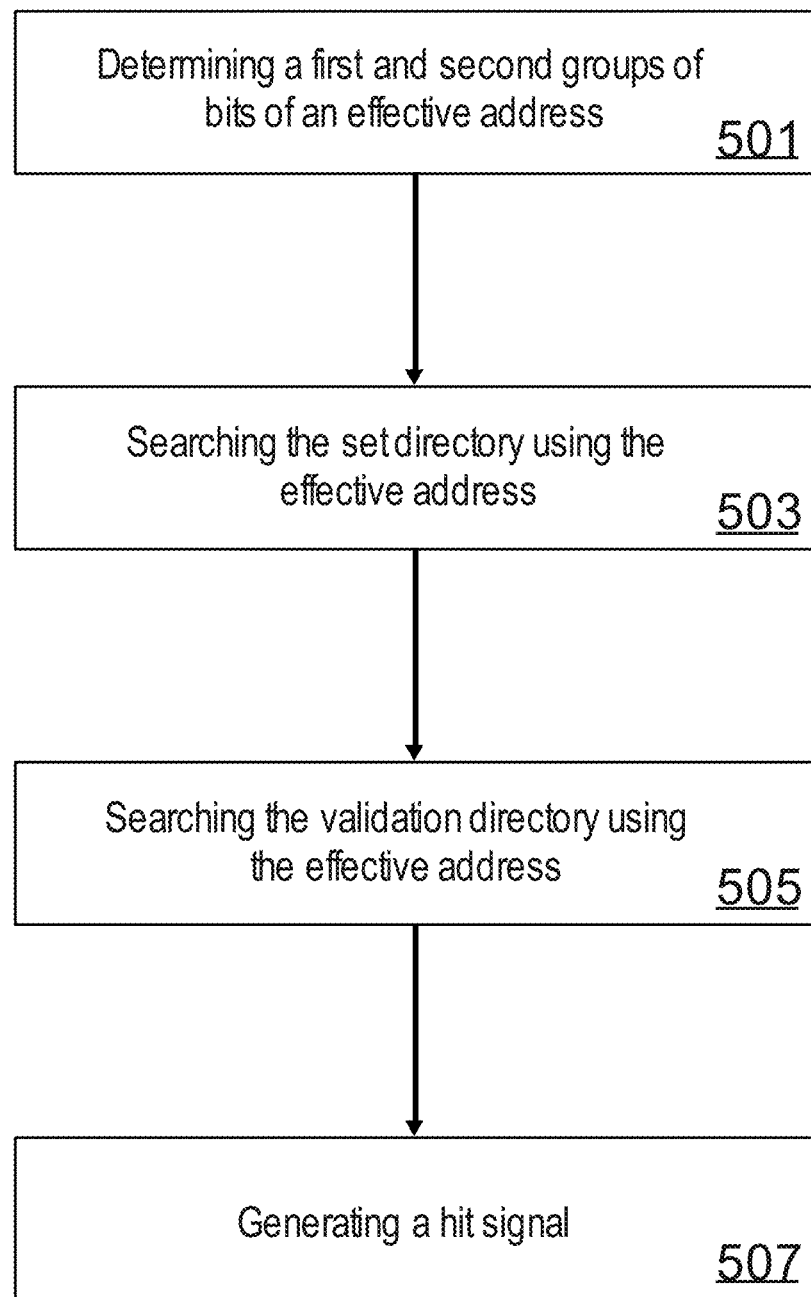
FIG. 5 is a flowchart of a method for controlling access to a cache memory.

FIG. 5 is a flowchart of a method for controlling access to a cache memory e.g. 200 via an effective address e.g. 201 comprising a tag field 212 and a cache line index field 210.

In step 501, a first group of bits 212a and a second group of bits 212b of the tag field 212 may be determined.

In step 503, the line index bits and the first group of bits 212a of the effective address may be searched in the set directory 203, thereby a set identifier is generated for indicating the set containing a cache line of the effective address 201.

In step 505, the set identifier and the line index bits 210 and the second group of bits 212b of the effective address 201 may be searched in the validation directory 205 for verifying the presence of the cache line in the set having the set identifier provided in step 503. This step 505 may indicate or confirm the presence or non-presence of the cache line in the set by indicating if it exists in the validation directory 205.

In response to determining the presence of the cache line in the set based on the second searching of step 505, a hit signal may be generated in step 507. The hit signal may be used to provide the data of the cache line from the data array 141.

In one example, step 503 and/or step 505 may result in a cache miss in that the searched address are not found in the set directory 203 and the validation directory respectively. In this case, the cache miss may be confirmed by accessing the TLB 143 and the secondary cache directory 242 as described with steps 380 to 399.

TLB Invalidations

According to one embodiment, the method further comprises in response to receiving a request for invalidating a validation directory entry of the validation directory, setting accordingly a valid bit of the corresponding primary cache directory entry in the primary cache directory.

According to one embodiment, the method further comprises providing a first auxiliary data structure in association with the primary cache directory, wherein each entry of the first auxiliary data structure comprises bits of the effective address which reflect information indicated in TLB purge requests of the multiprocessor system, identifying an entry in the first auxiliary data structure that corresponds to the received request, the identified entry indicating the primary cache directory entry.

For example, if an address space for a guest operating system is removed by a corresponding hypervisor, the cache lines are still in the L1 cache. But there is no valid translation for them anymore. This means that the data in the L1 cache should not be accessible by a request using the removed translation. To make these entries inaccessible, they should be invalidated in the L1 cache because the L1 cache directory is logically tagged. Before invalidation, the affected entries should be found. For example, a bit may be used as part of the entry information in the validation directory to indicate that a particular entry belongs to a guest operating system. If the TLB invalidation removes all translation information related to that guest operating system, all directory entries in the validation directory 205 with the guest bit set should be invalidated.

With the validation directory 205, only one entry can be looked at at any time to figure out if it should be invalidated (or purged) or not. To alleviate this issue, the L1 directory 142 is extended with a side structure "ptrdirext" (i.e. the first auxiliary data structure) that holds translation relevant information for each entry in the validation directory 205. As with the L1 directory, all sets can be accessed in parallel in the first auxiliary data structure. For example, an entry of the first auxiliary data structure may comprise "set0-th ASCE (44:49), PGSZ(0:1), SX(37:43)", where PGSZ refers to page size (e.g. dynamic address translation results can be for 4k, 1M or 2G page sizes), SX(37:43) refers to bits 37:43 of the effective address, and ASCE(44:49) are bits 44:49 of the effective address used as address space identifier by a respective thread th.

For example, a sequence of virtual addresses associated with virtual storage pointed to by an address space control element (ASCE) may be called an address space. Address spaces may be used to provide degrees of isolation between users. The structure of the first auxiliary data structure may enable to purge entries associated with a given address space in a more efficient manner using the ASCE bits.

With this side structure, TLB invalidations that should only affect certain translations may be done significantly faster than by scrubbing through all entries in the validation directory one by one.

The side structure ptrdirext is written together with any update in the validation directory 205. A trade☐off can be made between the size of the ptrdirext and the accuracy of TLB invalidations. To address the case of guest vs. hypervisor ownership, a single bit is needed to make the differentiation. If a TLB purge is done based on an address space identifier such as the ASCE in z/Architecture, i.e. a 51 bit value plus some control information, it may be enough to store just a few bits or a hash of some bits to filter out which entries have to be purged and which not. An example implementation of the ptrdirext might hold part of the ASCE bits, guest level identifier bits, a page size indication (for TLB architectures that support multiple page sizes), a segment index or part of the segment index (for TLB architectures that support multi☐level pages tables, where a higher level is called the "segment table", and invalidations based on the segment table are possible). For example, if the valid bit is part of the L1 directory entries, the actual invalidation of entries can also be done in parallel to all the entries of a set in a given L1 directory.

For the purpose of describing the following figures, the following terminology is used.

Actual memory access is done using a "real" address. This could be, for example, a 64-bit value addressing main memory locations. However, any value or approach to an addressing system can be used.

Instructions running on the processor core use "logical" addresses. If dynamic address translation (DAT) is not used, the processor is running in "real" addressing mode, and the logical address used by the program is also used as the real address.

If DAT is used, the processor is running in "virtual" addressing mode. Virtual addressing information includes the logical address as specified by instructions, plus additional information to identify a particular address space, such as Address Space Control Element (ASCE) found in, for example, the z/Architecture offered by International Business Machines (IBM). However, other virtual to real translation approaches can be used. This virtual addressing mode can be used to give every program its own address space, using different logical to real address mappings.

Virtual Cache

Figure 6:
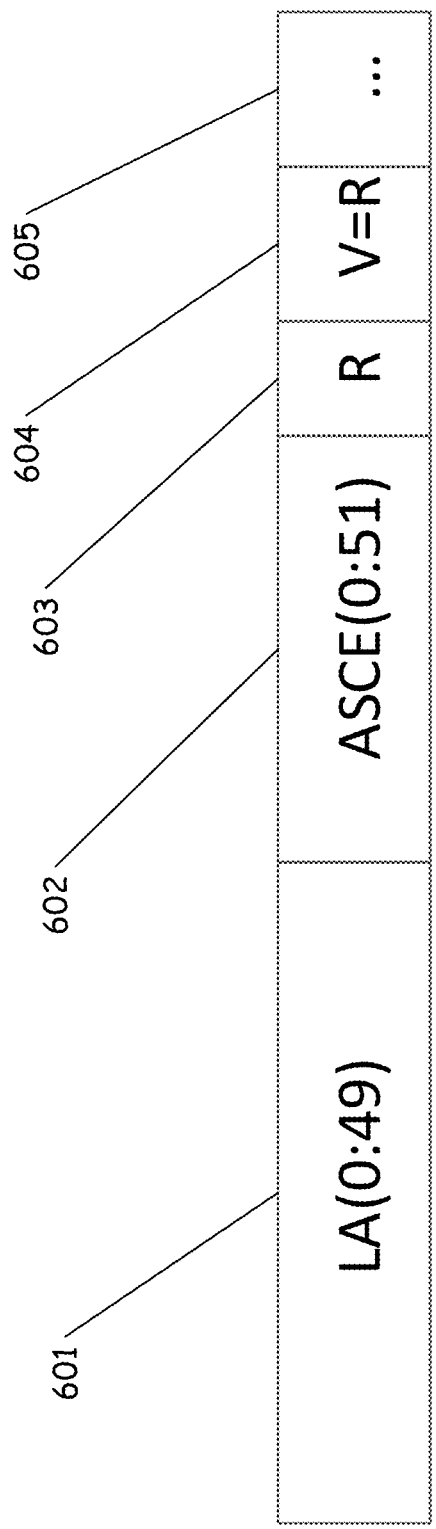
FIG. 6 is a diagrammatic illustration of a tag according to embodiments.

The virtual cache's directory 142 ("logdir") tag 600 (referred to herein as "logdir") holds all the information related to translations that a traditional translation lookaside buffer (TLB) 143 would typically hold. FIG. 6 is a diagrammatic illustration of an exemplary logdir tag 600 according to embodiments. The tag 600 includes the logical address bits 601, illustrated as bits 0:49, an address space identifier (illustrated as "ASCE" here) 602, a "real" bit indication R 603 (marking an address as virtual vs. real), a virtual to real address indicator 604, and potentially other contents 605.

In the approach described above with respect to FIGS. 1-5 and in the copending U.S. patent application Ser. No. 15/625,223 entitled, "Cache structure using a logical directory" filed Jun. 16, 2017, the contents of which are hereby incorporated by reference in their entirety, multiple translations cannot co-exist in the directory at the same time.

Real and Virtual Translations

Operating systems often use real addresses directly. That is, no address translation is required in order to find the actual information, instructions or data held by the processor. In the logdir of a virtual cache, this means the entry is marked as a "real" address by setting the "R" bit 603 to indicate that no address translation is required.

However, each program running on top of an associated operating system usually maintains in its own address space, using for example DAT to provide virtual memory. Cache lines accessed that way can be identified by the "R" bit 603 being cleared. That is the "R" bit 603 is set to indicate that the address is not the real address and that address translation is required to locate the actual information, data or instructions associated with that cache line.

For certain address ranges that are shared between the operating system and user code (e.g. programs operating on top of the operation system), the operating system may create a virtual address mapping for the user code that translates the logical address into the same real address. For example, assume address 0x1000 is used to exchange information between the operating system and the user code. The operating system accesses all memory using real addresses. User code accesses all memory using virtual addresses. For user code, logical address 0x1000 is mapped to real address 0x1000.

Figure 7:
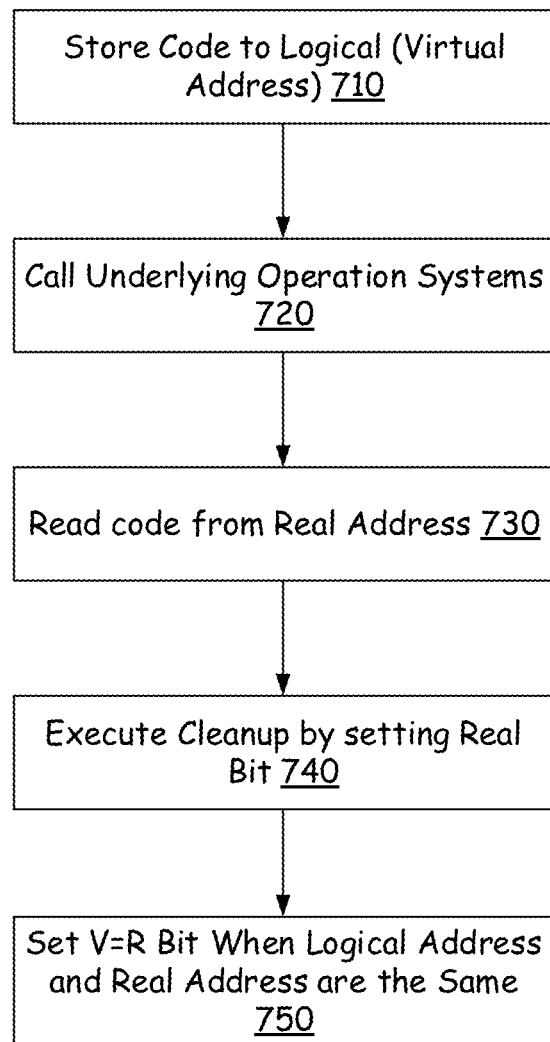
FIG. 7 is a flowchart illustrating a process of data transfer through shared memory.

FIG. 7 illustrates a process for data transfer through the shared memory location when the virtual to real bit 604 is not present (e.g. not included) in the logdir tag 600, but the virtual and the real addresses are the same address. In this approach, the following sequence of events occurs for a data transfer through the shared memory location.

The process begins when user code stores a code to a virtual address. This is illustrated at step 710. For example, the user code can store a function code to the virtual address. For purposes of this discussion the virtual address is 0x1000. However, any address can be used. To implement this, the logdir 600 creates a virtual directory entry for this particular cache line with DAT on and the R bit off at the logical address of 0x1000 (e.g. indicating a virtual address). This value of entry for the cache line indicates that the address space is for the user code that stored the code in the cache line.

Next the user code calls the underlying operating system. This is illustrated at step 720. The user code calls the underlying operating system using the protocols associated with the operating system, the details of which are not discussed in greater detail herein. In some embodiments the underlying operating system is accessed by the user code through a hypervisor that enables virtual machines to execute on top of the underlying operating system.

In response to the call from the user code, the operating system reads the code from the real address. This is illustrated at step 730. At this step, the operating system reads the code from the real address of 0x1000 (the same as the virtual address). This results in a logdir miss. As the real address access is looking for an entry in the logdir that has the real bit 603 turned on (e.g. R=1). As such the R=0 synonym should be cleaned up using the transload process described above with respect to FIGS. 1-5. This cleanup is illustrated at step 740. As a result of the clean up the logdir entry for the cache line will be updated to the real entry for the cache line. This results in the DAT set to off and the R bit 603 set to on, for the logical address 0x1000.

On each following iteration where the user codes store another function code to the virtual address 0x1000 a logdir miss will occur, because the real bit is set to on. This results in the synonym having to be cleaned up yet again and the logdir being updated accordingly. This can repeat for every use of the shared address. It should be noted that the comparison of the R-bit 603 discussed herein is necessary as it is possible to have a different logdir entry where the logical address to real mapping is different. That is, the virtual address and the real address are not the same logical addresses.

In order to address these virtual/real address synonym cleanup actions illustrated above with respect to FIG. 7, a new bit can be added to the logical directory. This is the virtual to real indicator 604. This bit 604 may be called "V=R" ("virtual address equals real address"). The V=R bit 604 is set if the real address that is the result of a DAT-on address translation is the same as the logical address it started with (i.e. the log address is the real address). In the example discussed above with respect to FIG. 7, the V=R bit would be set as a result of translating the virtual address 0x1000 for user code into the real address 0x1000.

Figure 8:
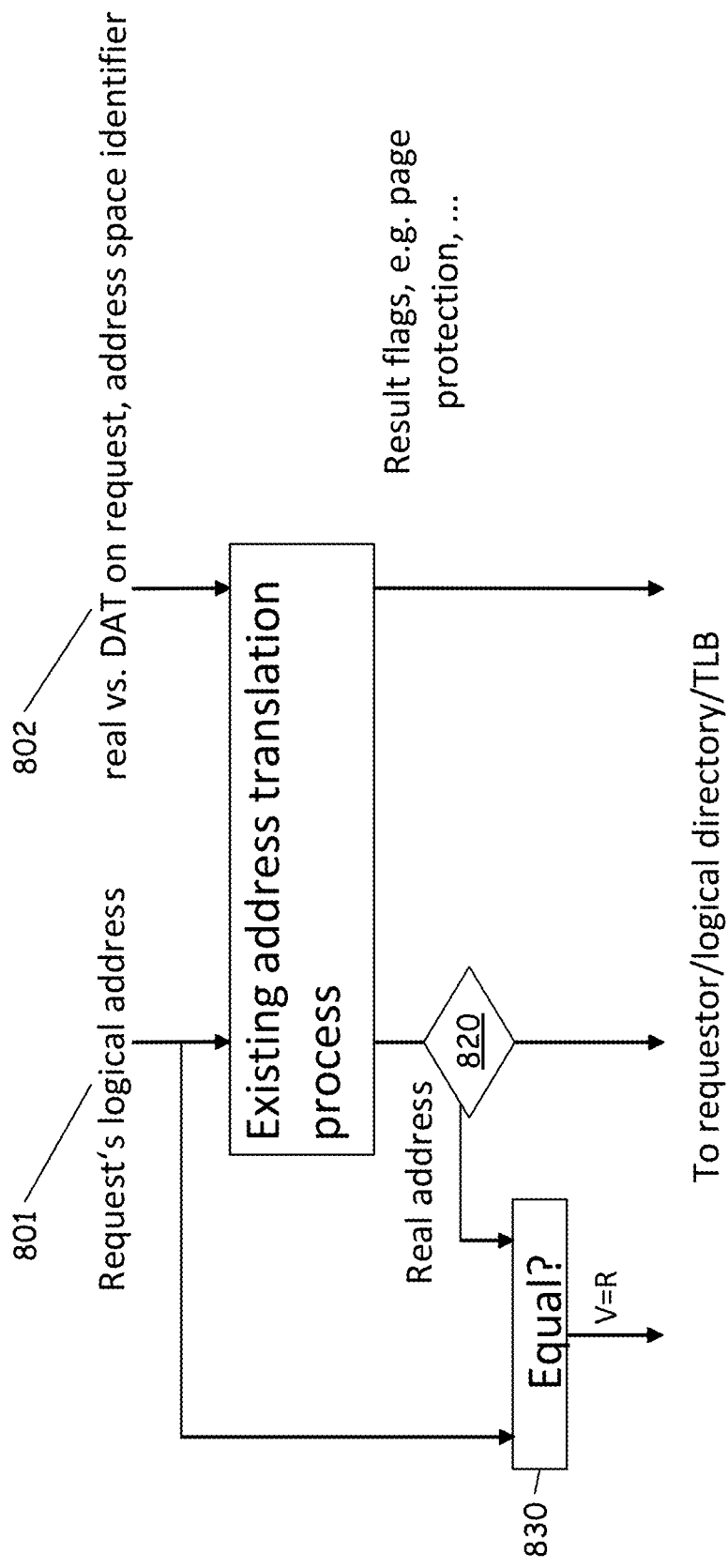
FIG. 8 is a flowchart illustrating the extension of virtual to real into the cache according to embodiments.

To set the value of the V=R bit, in which the virtual address is the same as the real address, the process of address translation is extended. FIG. 8 illustrates the extension process. Step 810 illustrates the previous existing address translation process. Any address translation process can be implemented at this step. In order to enter the translation process a request for a logical address 801 or a real vs DAT on request 802 is received. In response to the request, the process determines if there is a request for a real address. This is illustrated at step 820. If the request is for real address, a new comparator outputs a V=R indication if the resulting real address and the input logical address are identical. This is illustrated at step 830.

Additionally, in embodiments, the TLB 143 is extended by a V=R bit in every TLB entry, such that a TLB hit can also return the V=R information. Alternatively, the V=R indication can also be re-calculated after every TLB lookup. In this approach, it is possible to save the additional bits in the TLB, at the expense of having the V=R compare process in the TLB lookup path.

Figure 9:
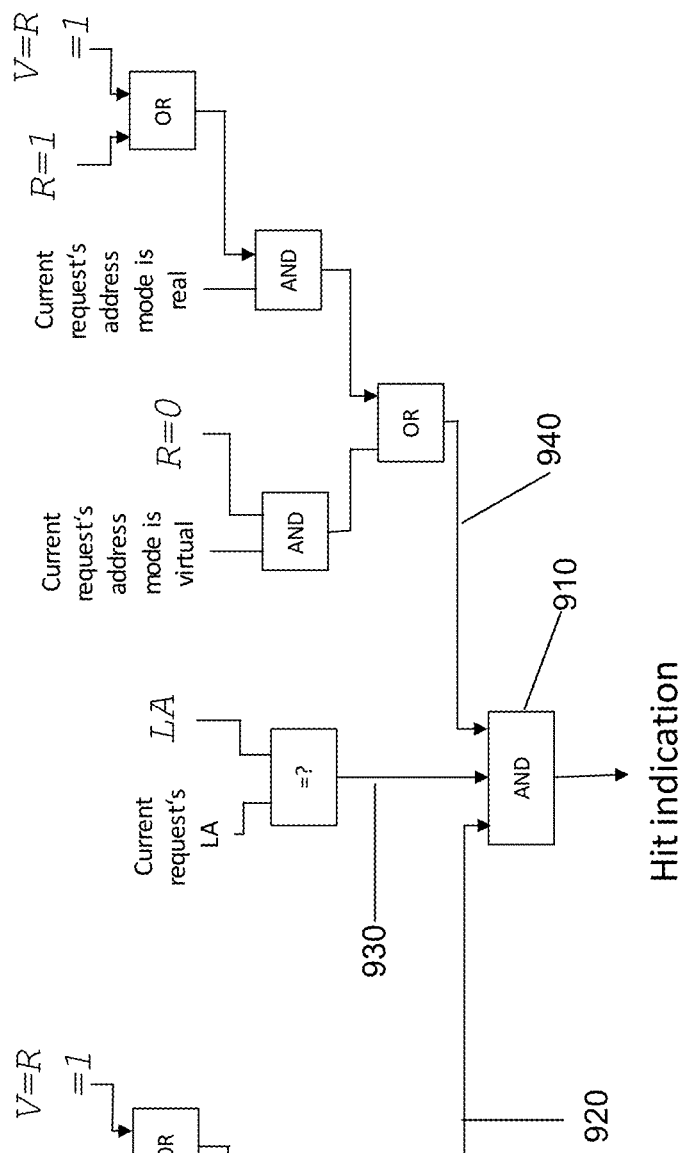
FIG. 9 is a diagrammatic illustration of a directory compare using the extension according to embodiments.
Figure 9:
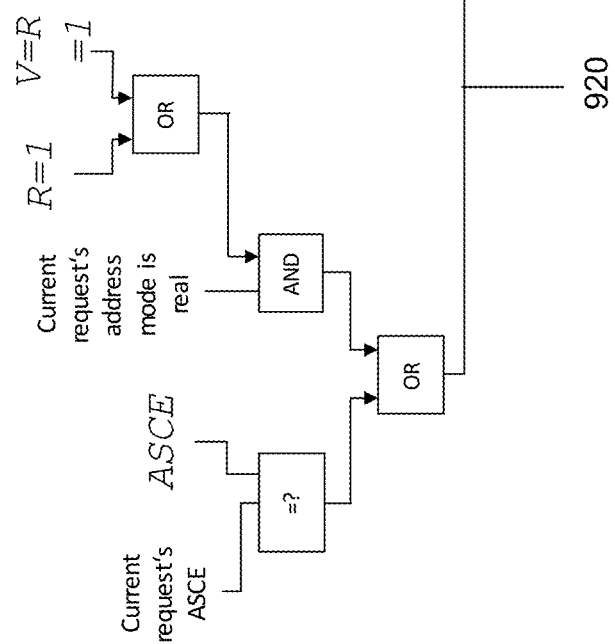

In order to allow access to the entry as both a virtual and a real address, the directory hit compare logic is also enhanced. In embodiments, if a lookup for a V=R address is done as part of a virtual cache lookup, the normal directory compare logic applies. However, if the lookup is done for a real address, and the V=R bit in the directory entry is set, all DAT-on information, such as the ASCE, are ignored. In this way, the directory entry can be used as both a virtual and a real entry. FIG. 9 illustrates an example implementation of a directory compare including the V=R logic of the present disclosure At the bottom of the figure is a 3-way AND 910 at the bottom of FIG. 9 calculates the "hit" information for the cache line. The left input 920 of the AND 910 handles the comparison of the information that is relevant for DAT-on condition in the logdir. If the DAT is on and the input receives an input for the V=R case, and if it is a real address request, and the V=R bit is set, then the DAT-on information is ignored. The middle input 930 of the AND 910 receives the result of the logical address compare. The right input 940 of the AND 910 qualifies the compare with the requested address mode. Either the request is virtual, and the directory entry is virtual as well, or both are real, or, with the enhanced V=R, the request is real and the directory is V=R. This enhancement discussed with respect to FIGS. 8 and 9 is inserted into the process illustrated in FIG. 7 as step 750. At this step, following the cleanup of the synonym at step 740 the V=R bit is set to a value indicating V=R is on or true. In some embodiments, the DAT can be reset to on at this point, depending on the logic used by the user code or the operating system in accessing what they believe to be virtual addresses.

Turning now to FIGS. 10-17, a process for managing translations across different threads is discussed.

Translations in Different Threads

Figure 10:
FIG. 10 is a diagrammatic illustration of a tag according to embodiments.

The virtual cache's directory 142 ("logdir") tag holds all the information related to translations that a TLB, such as TLB 143, usually holds. FIG. 10 illustrates an example tag 1000 according to illustrative embodiments the tag 1000 includes the logical address bits 0:49 (1001), an address space identifier 1002 ("ASCE"), a "real" bit indication 1003 (marking an address as "does not need address translation", usually for operating system use), and other content required or helpful to determine cache hit vs. miss, collectively 1004. In some embodiments, the tag can include the V=R bit discussed above with respect to FIGS. 6-9.

In some microprocessor architectures, such as the z/Architecture offered by International Business Machines (IBM), address translation validity is defined per thread. Therefore, a cache directory entry in the logdir created by one thread is not necessarily valid for other threads. The directory lookup process does not include performing the actual address translation. Therefore, the directory look-up process does not include checking if the address translation is currently valid. Instead, the address translation is preformed (and its validity checked) on either the creation or update of an entry.

In the approach described above with respect to FIGS. 1-5 and in the copending U.S. patent application Ser. No. 15/625,223 entitled, "Cache structure using a logical directory" filed Jun. 16, 2017, the contents of which again are hereby incorporated by reference in their entirety, multiple threads can be supported by extending the directory tag with an additional field identifying the thread that created the cache directory entry. Following the rules discussed above, the thread-ownership switches between threads (by executing "transloads") when a thread different from than the current owner of the cache directory entry wants to access the shared cache line. If the change in the ownership of the shared cache line happens frequently, this constant switching of the ownership of the cache line creates a performance issue.

The present disclosure addresses this performance issue by adding per-thread valid bits to the cache directory 1005. In the design discussed above, this is achieved by adding per-thread valid bits in the ptrdir. The TLB invalidations can also work by looking only at entries for the thread that does the TLB invalidation, and turning off only the valid bits of that thread. In this way, the cache line stays accessible for other threads, even after one thread "lost" its translation to that line.

In the present embodiments, it is possible for a thread to own a cache line in the L1 cache without having any valid translations for the cache line. Both of the threads that access the translations could have had their translations invalidated independently, resulting in an entry for a cache line with no valid translation to it. In some embodiments for other microarchitecture reasons a "cache line still in L1" bit is desired, another valid bit ("line valid") 1006 can be added to the cache directory that can be turned off only upon a full cache line invalidation. A full cache line invalidation can occur, for example, as a cross-invalidate from another processor core. In embodiments employing this approach, a cache line is considered valid for a given lookup if the lookup thread's valid bit is set, identifying the translation to the cache line as valid, and the "line valid" bit is set.

With the addition of the per-thread valid bits to the cache directory, the process to allow two threads to share the same cache line using the same translation is discussed below with respect to FIG. 11 and FIG. 12. The process discussed below assumes two different threads accessing the same cache line, and that the cache line was not in the L1 cache, but was already in L2 cache at the beginning of the process. FIG. 13 discusses and illustrates the full decision process of FIG. 11 and FIG. 12.

Figure 11:
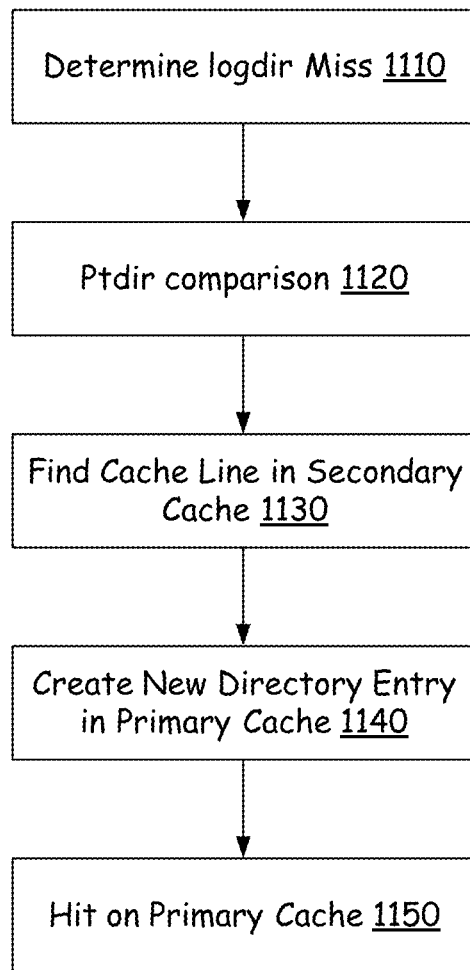
FIG. 11 is a flowchart illustrating a process for accessing a cache line by a first thread according to embodiments.

FIG. 11 illustrates a process of first thread attempting to access a particular cache line, according to embodiments. The process begins when the first thread determines that there is a logdir miss in the L1 cache. This is illustrated at step 1110. A logdir miss occurs when the thread attempts to find the particular entry in the cache directory. A cache miss occurs when the thread searches the L1 cache for the specific cache line, but does not find the cache line in the L1 cache.

Following the logdir miss, the process continues to perform a ptrdir comparison. This is illustrated at step 1120. At this step, the process determines that the cache line is not found in the L1 cache at all. The ptrdir comparison is performed through any know process used for a ptrdir vs L2 directory/TLB lookup.

Next the process performs an L2 directory compare to find the desired cache line. This is illustrated at step 1130. At this step, the process determines that cache line is present in the L2 cache. Had the cache line not been found in the L2 cache, the process would repeat this step for the L3 cache or any lower level cache that is present in the processor structure, until such time as it finds the desired cache line. As the cache line is found in the L2 cache the process identifies this cache line for reloading into the L1 cache.

Once the cache line has been identified in L2 or lower cache, the process proceeds to create a new directory entry for the cache line in the L1 cache. This is illustrated at step 1140. At this step, the process can choose an already existing entry in the cache directory to overwrite. In some embodiments, the entry to overwrite is the oldest entry. In some embodiments, the entry that is overwritten is the entry that has not been accessed for a period of time. In other embodiments, the entry is the entry that has the fewest accesses. However, any approach for selecting the directory entry to overwrite can be used. Once the directory entry is selected for overwriting the process proceeds to update the L1 cache data structures for the cache line, and sets the validity bit for the thread to indicate that the first thread is the owner of the cache line. At the same time the validity bit for the second owning thread is invalidated for the cache line. The invalidation of the validity bit for the other thread is done because the other thread could have had a valid bit set in the directory entry that is being overwritten. The new translation (cache line entry) is not necessarily valid for the other (second) thread as well.

After the cache line has been loaded into the L1 cache, the first thread can hit on this entry as needed. This is illustrated at step 1150. That is the first thread can access and find the associated logdir in the L1 cache.

Figure 12:
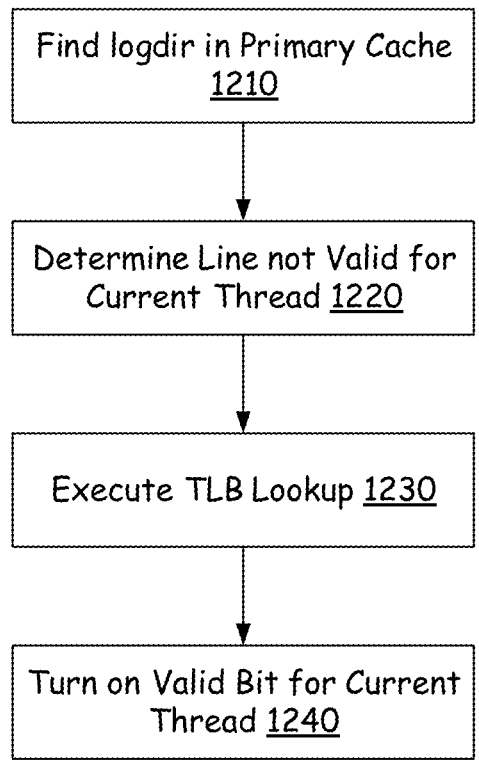
FIG. 12 is a flowchart illustrating a process for accessing a shared cache line by a second thread according to embodiments.
Figure 13:
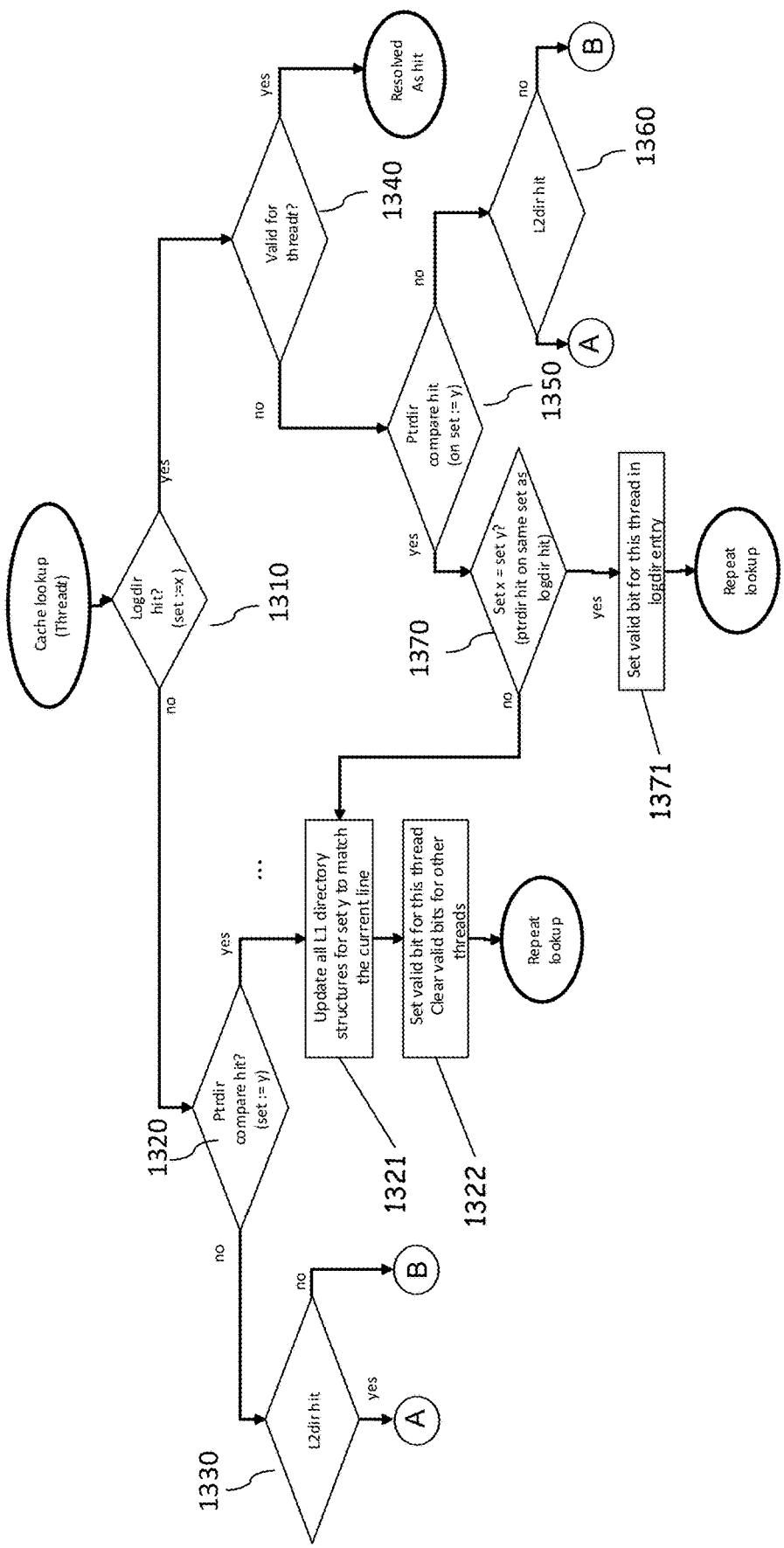
FIG. 13 is a decision tree illustrating the process of FIG. 11 and FIG. 12 combined according to embodiments.

FIG. 12 is a process diagram illustrating a process for a second thread to lookup the cache entry following the process of FIG. 11, according to embodiments. The process of FIG. 12 is similar to the process discussed above with respect to FIG. 11, and for purposes of the discussion of FIG. 12 the details of similar steps are not discussed in greater detail here. The process begins when the second thread performs a logdir lookup and finds a hit for the logdir in the L1 cache. This is illustrated at step 1210.

Following the determination that cache line was in the L1 cache, the process determines that the cache line is not valid for the second thread. This is illustrated at step 1220. The validity for the second thread is not valid as the validity of the translation for the entry has only been determined for the first thread. The process for determining if the cache line is valid for the second thread can be executed using any known method of determining a cache line is valid.

As the cache line is not valid for the second thread, a ptrdir and L2 directory/TLB lookup is performed. This is illustrated at step 1230. At this step, the second thread determines that the cache line is present in the L1 cache. (Moved to L1 by process of FIG. 11). The location of the cache line hit is determined to be at same cache line where the logdir hit was found at step 1210. This hit on the same cache line confirms that the translation is already in the L1 cache, and the translation matches the translation for the first thread.

The L1 cache's valid bit for the second thread is turned on. This is illustrated at step 1240. Further, the valid bit for the first thread is also left to on. This results in both the first thread and the second thread being able to use the cache line in parallel.

FIG. 13 is a diagrammatic illustration illustrating the combined process of FIG. 11 and FIG. 12 represented as a decision tree according to embodiments.

If no logdir hit is seen in step 1310, and no ptrdir hit is seen in step 1320, then the cache line is not in the L1 cache currently. So step 1330 determines based on the L2 directory lookup result whether to reload the cache line from L2 cache (path (A)) or L3 cache path (B) (discussed in greater detail with respect to FIG. 14).

However, if the ptrdir compare in step 1320 sees a hit, then the line is already in L1 cache. In instance, the L1 directory is updated to match the current requesting threads information (step 1321). The valid bit for the current thread is set, the valid bits for all others are invalidated (step 1322). Again, this step is performed, because, as a result of the directory update to the current request's information, the translation information in the directory may not be correct for other threads anymore.

If the logdir compare shows a hit, but step 1340 does not find the valid bit for the requesting thread set, the tree moves to the next to step 1350 and checks the ptrdir compare result. If no hit is seen, the cache line is not in L1, and step 1360 follows similar to step 1330 to bring the cache line into L1. If the ptrdir compare 1350 shows a hit, then step 1370 compares the ptrdir hit setid against the logdir hit setid from step 1310. If they match, then the current request's cache line is already in L1, with the correct logdir tag information. Only the valid bit is missing for the second thread. Therefore, the valid bit for the current requesting thread is turned on, and if other valid bits were active already, the cache line is now shared between multiple threads. If the setid compare 1370 shows that the L1 hit was on a different setid, that entry is updated to the current requesting threads information, the current requesting thread's valid bit set, and all other thread's valid bits cleared again. This is illustrated at step 1371

Figure 14:
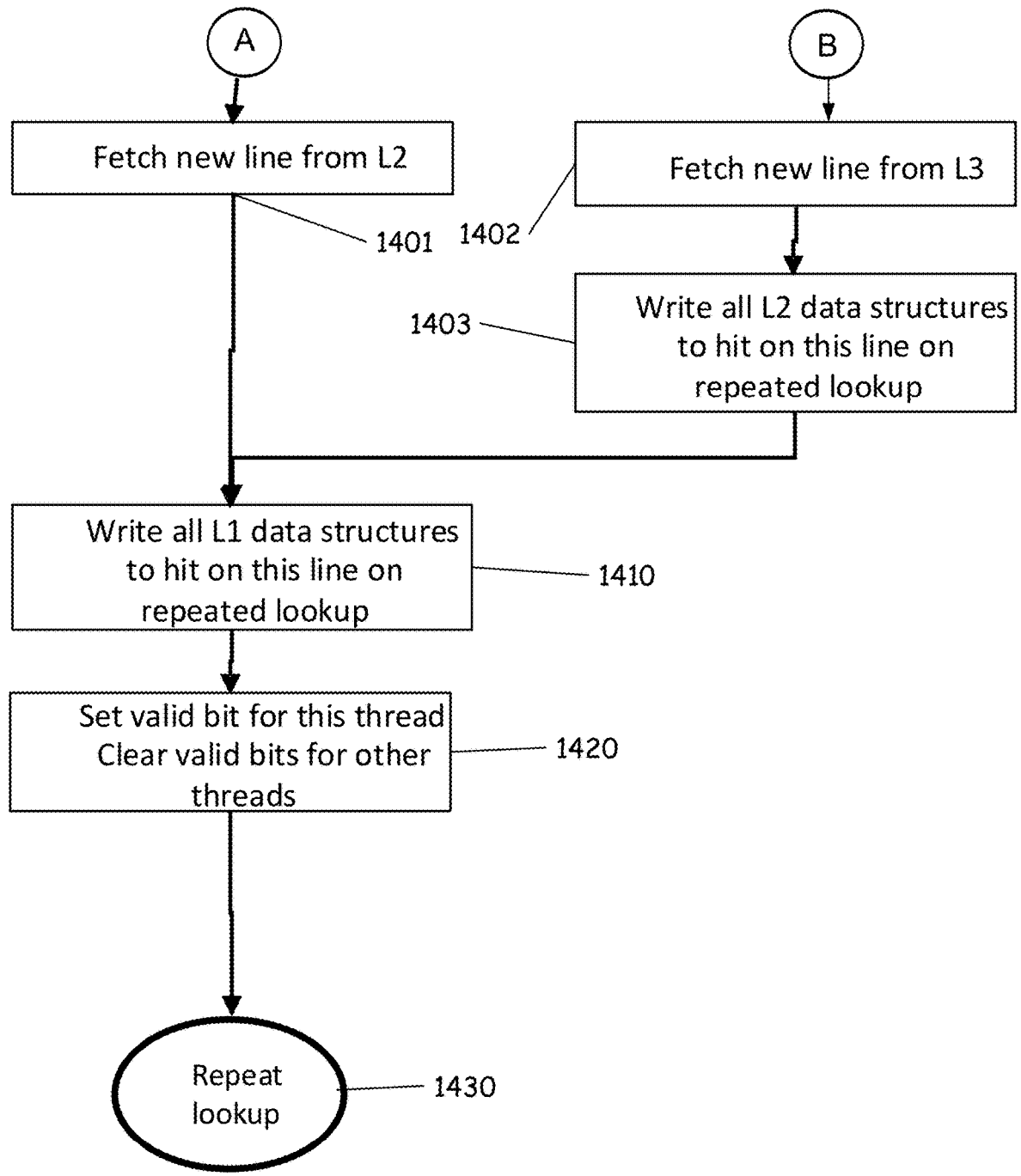
FIG. 14 is a flowchart illustrating the resolving of an L1 cache miss according to embodiments.

FIG. 14 is a flow diagram illustrating the resolving of an L1 cache miss according to embodiments. Entry into the process 1400 is achieved from either path A or path B of FIG. 13. Path A represents L1 cache miss and an L2 cache hit, while path B represents an L1 cache miss and a L2 cache miss. Entering process 1400 from path A at step 1401 the cache line from the L2 cache is fetched. Entering process 1400 from path B at step 1402 the cache line is fetched from the L3 cache. Once the line is fetched the process at step 1403 writes all L2 data structures to hit on the L3 cache line on each repeated lookup. Following either step 1401 or 1403 (depending on the entry path) the processes merge. At step 1410 the L1 data structures are written to hit on this cache line upon each subsequent lookup. At step 1420, the valid bit in the cache line entry is set for the corresponding thread that requested the particular cache line. The lookup can be repeated at step 1430.

Different Translations in Different Threads

In a simultaneous multithreading core (SMT), each thread potentially needs a translation of its own for an absolute address that is shared between threads. In the thread sharing approach described above, this results in Thread 1 not finding the correct information (e.g. logical address, ASCE, . . . ) during the L1 directory lookup. Therefore, setting the valid bit for this thread would be erroneous even though the ptrdir vs. L2 directory/TLB compare process shows that the correct cache line is in the L1 cache already. A different translation (i.e. the one from the first thread) would end up being used for that line. In this approach, the situation can be handled as if no per-thread directory valid bit existed in the cache line i.e. performing a transload. The existing (first) thread's logdir entry is overwritten with the second thread's information, and the other first thread's valid bit is turned off.

Figure 15:
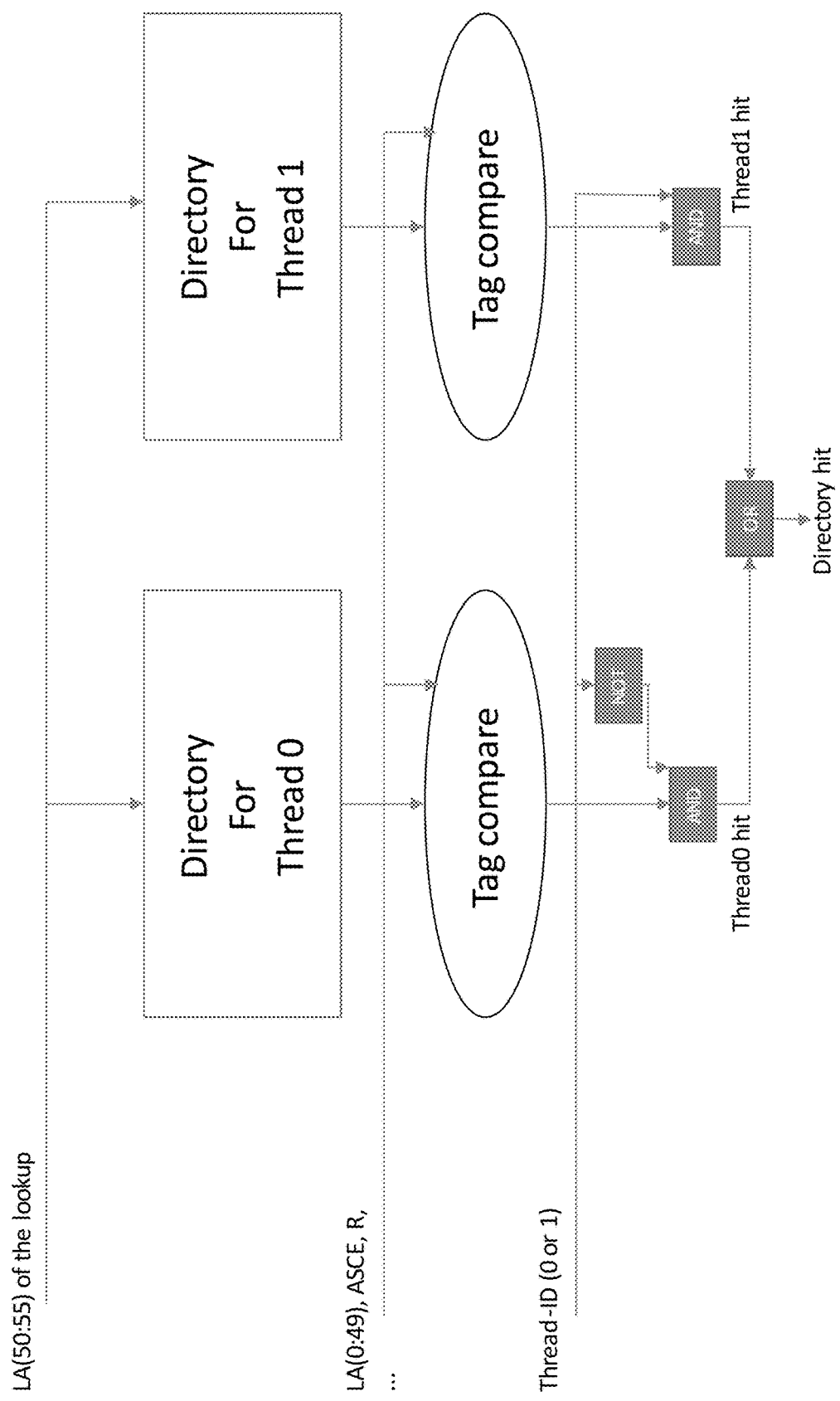
FIG. 15 is a diagrammatic illustration of sharing cache for threads using different translations.

FIG. 15 illustrates a solution for sharing cache lines in a logdir that use different translations according to embodiments. Assuming two threads, the full directory tag information is duplicated. The tag compare result is further qualified with the request being for the first thread for the first thread directory, and with the request being for second thread for the second thread director directory. A directory hit occurs if one of the hit signals is active.

In some embodiments, it is not necessary to actually power up both directories. The thread ID of a request would be known early in the process. The knowledge of the corresponding thread ID can be used to turn off the structures that are for the "other" thread. So, while the logdir area is duplicated, in some embodiments, in particular for a dual-threaded core that is more power constrained than area constrained. This approach eliminates the need to consider the tag compare result in the L1 cache lookup of the thread that wants to share a cache line. The thread has its very own directory entry, and does not need to match on the existing directory entry of the other thread.

Figure 16:
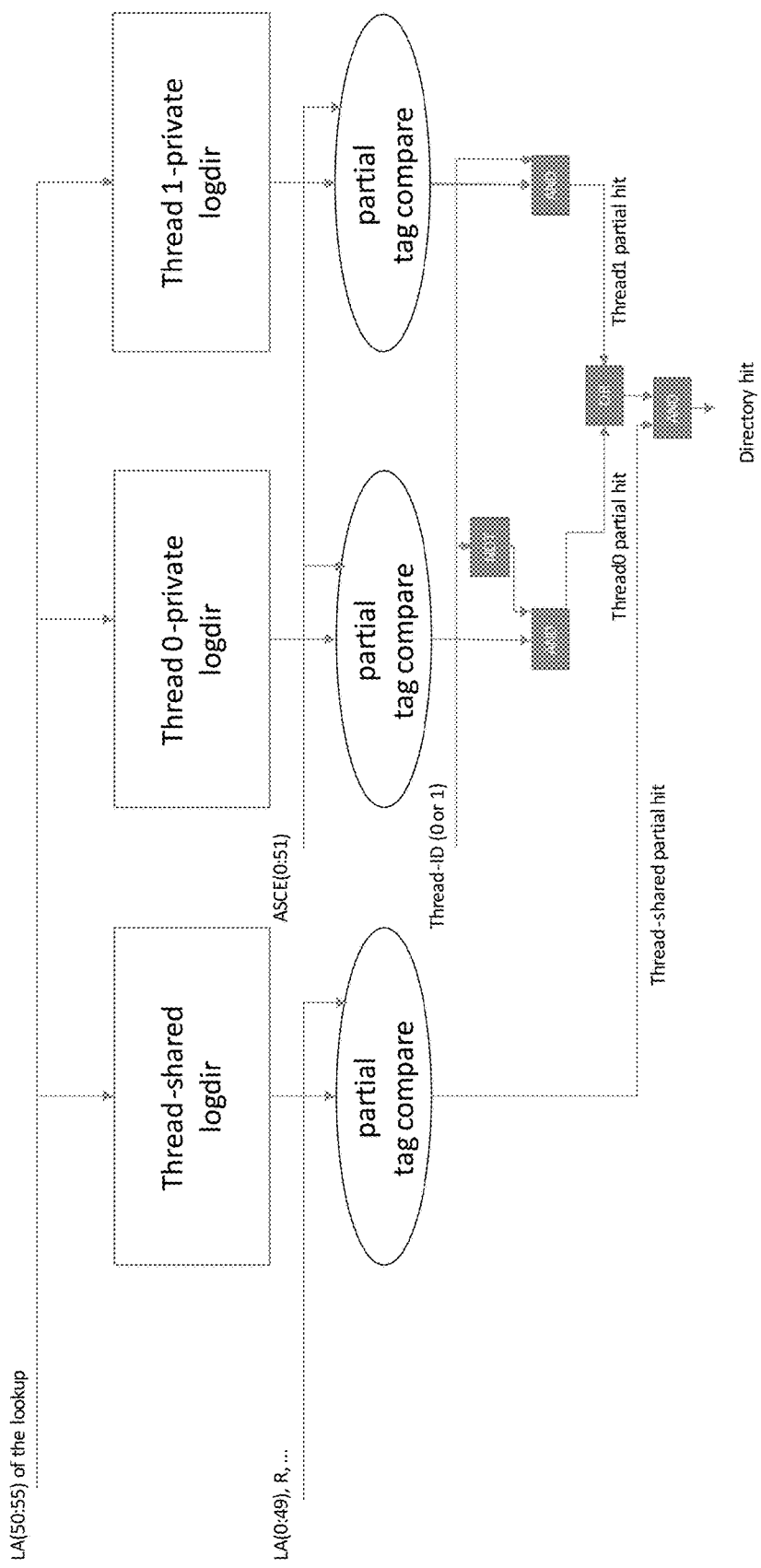
FIG. 16 is a diagrammatic illustration of sharing portions of a directory entry according to embodiments.

FIG. 16 illustrates an approach where some of the directory contents are shared between threads. This approach allows only partially different tag information. Thus, some of the overhead involved in a per-thread directory can be saved. The key is that depending on actual address sharing scenarios between threads, not all of the tag information is different. For example, memory shared between different programs running in different threads can be mapped to the same logical addresses, and only use a different address space identifier. In that case, only the ASCE has to be different per thread. This frequently occurs when using shared libraries.

In some embodiments, the tag is then split up into an ASCE-part that is duplicated per thread (in the first thread/second thread-private logdir), and the remaining bits that are stored in a Thread-shared logdir. Again, the thread-private structures only have to be powered up for the current thread's request. The final hit is calculated as a result of the per-thread and thread-shared tag hits.

Figure 17:
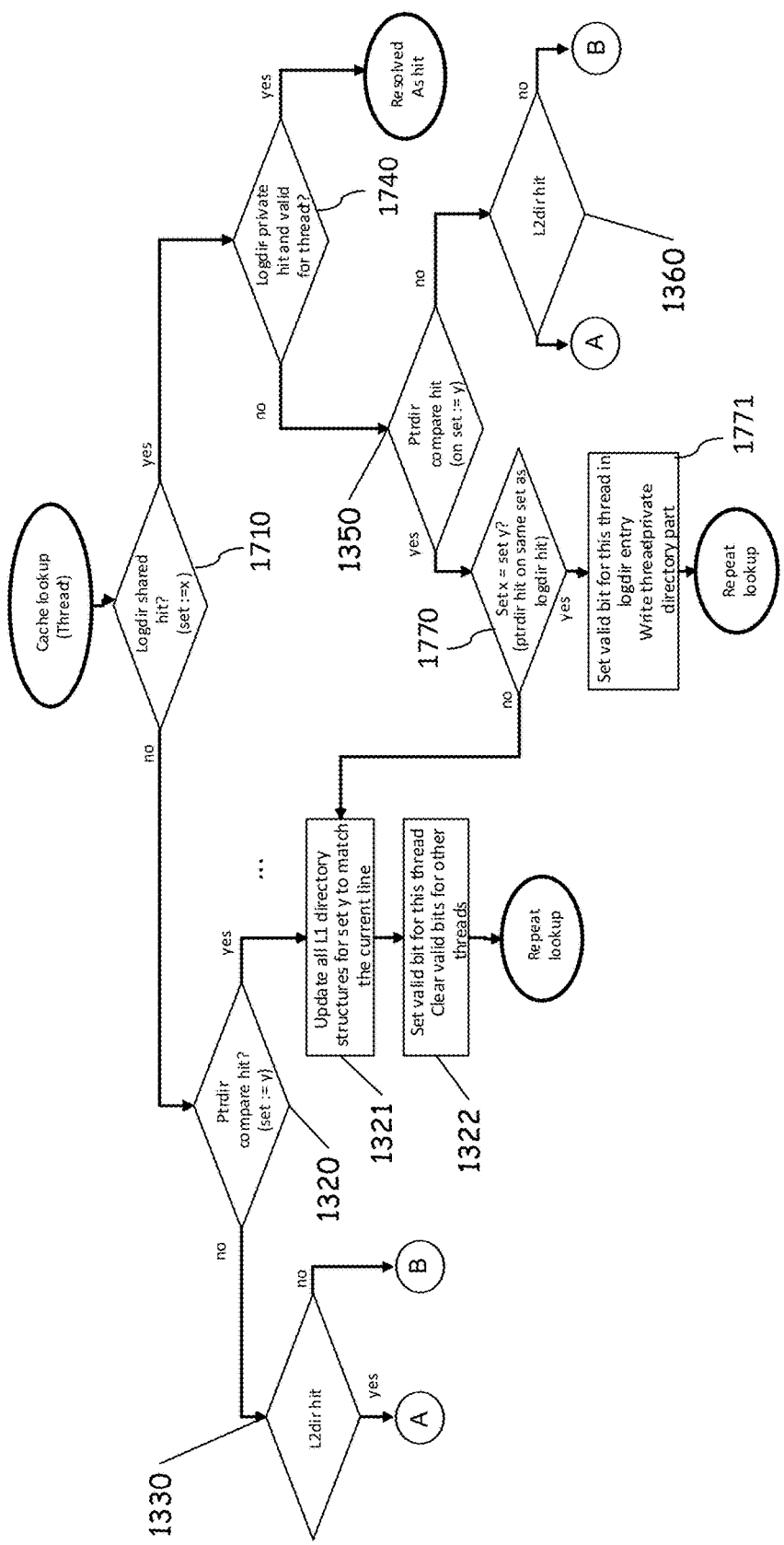
FIG. 17 is a decision tree implementing the process of partial thread sharing of directory entries according to embodiments.

FIG. 17 is a diagrammatic illustration of the decision tree according of FIG. 13 modified to process the partial sharing of per thread information in the logdir according to embodiments. References to paths A and B in FIG. 17 refer to the paths of FIG. 14. With separate thread-private and thread-shared parts in the directory, the decisions to be taken on a cache lookup are modified slightly from FIG. 13. Step 1310 is modified to decide based on the thread-shared part of the logdir. This is illustrated at step 1710. Step 1340 is modified to decide based on the result of the valid bit for the requesting thread, and the logdir private hit. This is illustrated at step 1740. Step 1371 is modified to not only update the valid bit, but also writes the thread-private part of the logdir. This is illustrated at step 1771. Still, if the ptrdir compare in step 1770 sees the hit in the "wrong" setid (e.g. not the one with the thread-shared hit) then the L1 directory content should be updated. This includes both the thread-shared and the thread-private part of the logdir. This is on account of updating the thread-shared part without knowing the valid translation for other threads necessitates that the other thread's valid bits should be turned off.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of operating a processor cache for a processor with virtual memory support, wherein a logically indexed and logically tagged cache directory is used, and wherein an entry in the directory contains an absolute memory address in addition to the corresponding logical memory address, and a virtual to real flag, comprising:
   storing code to a logical memory address in a first entry in the cache directory;
   calling, by user code, an underlying operating system;
   reading, by the operating system the code from the absolute memory address;
   determining if the absolute memory address is equal to the logical memory address; and
   in response to determining that the absolute memory address is equal to the logical memory address, setting the virtual to real flag to on.

2. The method of claim 1 wherein the user code accesses the underlying operating system through a hypervisor.

3. The method of claim 1 wherein storing code creates a directory entry in the cache for the entry with a dynamic address translation flag set to on and a real bit flag set to off.

4. The method of claim 3 wherein when the virtual to real flag is set to on, a status of the dynamic address translation flag is ignored.

5. The method of claim 1 wherein a translation lookaside buffer is configured to return information related to the virtual to real flag.

6. The method of claim 5 wherein, for each translation lookaside buffer lookup, the virtual to real flag is recalculated.

7. A computer program product having computer executable instructions for operating a processor with virtual memory support wherein a logically indexed and logically tagged cache directory is used, and wherein an entry in the directory contains an absolute memory address in addition to a corresponding logical memory address, and a virtual to real flag, that when executed cause at least one computer to execute a method comprising:
- storing code to a logical memory address in a first entry in the cache directory;
- calling, by user code, an underlying operating system;
- reading, by the operating system the code from the absolute memory address;
- determining if the absolute memory address is equal to the logical memory address; and
- in response to determining that the absolute memory address is equal to the logical memory address, setting the virtual to real flag to on.

8. The computer program product of claim 7 wherein the user code accesses the underlying operating system through a hypervisor.

9. The computer program product of claim 7 wherein storing code creates a directory entry in the cache for the entry with a dynamic address translation flag set to on and a real bit flag set to off.

10. The computer program product of claim 9 wherein when the virtual to real flag is set to on, a status of the dynamic address translation flag is ignored.

11. The computer program product of claim 7 wherein a translation lookaside buffer is configured to return information related to the virtual to real flag.

12. The computer program product of claim 11 wherein, for each translation lookaside buffer lookup, the virtual to real flag is recalculated.

* * * * *